(12) United States Patent
Hattori et al.

(10) Patent No.: US 12,246,469 B2
(45) Date of Patent: Mar. 11, 2025

(54) BUILDING MATERIAL MANUFACTURING APPARATUS

(71) Applicant: NICHIHA CORPORATION, Nagoya (JP)

(72) Inventors: Takahiro Hattori, Nagoya (JP); Hidenori Nishioka, Nagoya (JP)

(73) Assignee: NICHIHA CORPORATION, Nagoya (JP)

(*) Notice: Subject to any disclaimer, the term of this patent is extended or adjusted under 35 U.S.C. 154(b) by 532 days.

(21) Appl. No.: 17/576,739

(22) Filed: Jan. 14, 2022

(65) Prior Publication Data

US 2022/0143866 A1    May 12, 2022

Related U.S. Application Data

(63) Continuation of application No. PCT/JP2020/032819, filed on Aug. 31, 2020.

(30) Foreign Application Priority Data

Sep. 26, 2019   (JP) .................................. 2019-175871

(51) Int. Cl.
   *B28B 5/00*   (2006.01)
   *B07B 1/34*   (2006.01)
   (Continued)

(52) U.S. Cl.
   CPC .................. *B28B 5/02* (2013.01); *B07B 1/34* (2013.01); *B07B 1/52* (2013.01); *B07B 1/522* (2013.01);
   (Continued)

(58) Field of Classification Search
   CPC B07B 1/52; B07B 1/522; B07B 1/524; B07B 1/526
   See application file for complete search history.

(56) References Cited

U.S. PATENT DOCUMENTS 553,285 A * 1/1896 Jacobus .................. B07B 1/522
                                             209/390
2012/0199519 A1* 8/2012 Ward ...................... B07B 1/485
                                             209/241
(Continued)

FOREIGN PATENT DOCUMENTS

CN      205018983 U    2/2016
CN      205731970 U   11/2016
(Continued)

OTHER PUBLICATIONS

Machine translation of KR 101455850, retrieved from EPO database Jun. 28, 2024 (Year: 2024).*

(Continued)

*Primary Examiner* — Timothy Kennedy
(74) *Attorney, Agent, or Firm* — Kratz, Quintos & Hanson, LLP

(57) ABSTRACT

[Object] To provide a building material manufacturing apparatus that is suitable for suppressing clogging of a screen that screens a building raw material.
[Solution] A building material manufacturing apparatus X1 includes at least a screen part 10 and a cleaning mechanism part 40. The screen part 10 includes at least one screen sheet 12 that has an inclination and that has a screen mesh. The cleaning mechanism part 40 includes a scraping part 40a. When the apparatus operates in a building material manufacturing mode in which a building raw material M is supplied to the screen sheet 12 and the screen sheet 12 is performing a wave motion, the scraping part 40a is separated from the screen sheet 12, and, when the apparatus operates in a cleaning mode in which the building raw material M is not supplied to the screen sheet 12 and the screen sheet 12 is not performing a wave motion, the scraping part 40a rotates in contact with the screen sheet 12.

14 Claims, 12 Drawing Sheets

(51) Int. Cl.
*B07B 1/52* (2006.01)
*B28B 5/02* (2006.01)
*B28B 7/38* (2006.01)
*B65G 45/24* (2006.01)
*B65G 45/26* (2006.01)

(52) U.S. Cl.
CPC .............. *B07B 1/524* (2013.01); *B07B 1/526* (2013.01); *B07B 1/528* (2013.01); *B28B 7/386* (2013.01); *B65G 45/24* (2013.01); *B65G 45/26* (2013.01)

(56) References Cited

U.S. PATENT DOCUMENTS

| | | |
|---|---|---|
| 2020/0215718 A1 | 7/2020 | Ikeda |
| 2020/0316815 A1 | 10/2020 | Ikeda |

FOREIGN PATENT DOCUMENTS

| | | | | |
|---|---|---|---|---|
| CN | 206007154 | U | 3/2017 | |
| CN | 107649374 | A | 2/2018 | |
| CN | 108432470 | A | 8/2018 | |
| CN | 108745500 | A | 11/2018 | |
| CN | 209238370 | U | 8/2019 | |
| CN | 209406843 | U | 9/2019 | |
| JP | H04-338017 | A | 11/1992 | |
| JP | H07-124926 | A | 5/1995 | |
| JP | 2013-215704 | A | 10/2013 | |
| JP | 2017-007229 | A | 1/2017 | |
| JP | 2017-193181 | A | 10/2017 | |
| JP | 2020-163669 | A | 10/2020 | |
| KR | 2001-0105860 | A | 11/2001 | |
| KR | 2003093136 | A * | 12/2003 | ............... B07B 1/22 |
| KR | 10-1455850 | B1 | 10/2014 | |
| KR | 10-2018-0083624 | A | 7/2018 | |
| SU | 1586790 | A1 | 8/1990 | |
| SU | 1699657 | A1 | 12/1991 | |
| WO | 2019/131680 | A1 | 7/2019 | |

OTHER PUBLICATIONS

Machine translation of JP 2017193181, retrieved from EPO database Jun. 28, 2024 (Year: 2024).*
Machine translation of KR 20180083624, retrieved from EPO database Jun. 28, 2024 (Year: 2024).*
Machine translation of KR 20030093136, retrieved from EPO database Jun. 28, 2024 (Year: 2024).*
Office Action of corresponding Russian Patent Application No. 2022101953 dated Oct. 14, 2022 (7 sheets, 6 sheets translation, 13 sheets total).
International Search Report for International Application No. PCT/JP2020/032819 dated Oct. 27, 2020 (2 sheets).
Supplementary European Search Report for corresponding European Patent Application No. 20867823.5 dated Jan. 10, 2023 (2 sheets).
Office Action of corresponding Chinese Patent Application No. 202080047742.3 dated Feb. 5, 2024 (9 sheets, 4 sheets translation, 1 cover sheet, 14 sheets total).

* cited by examiner

FIG. 4
(a)
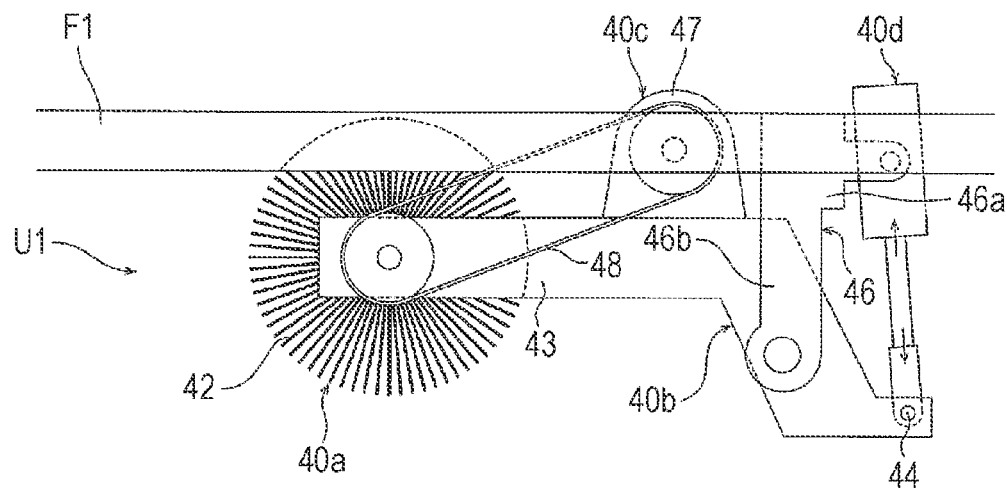
(b)
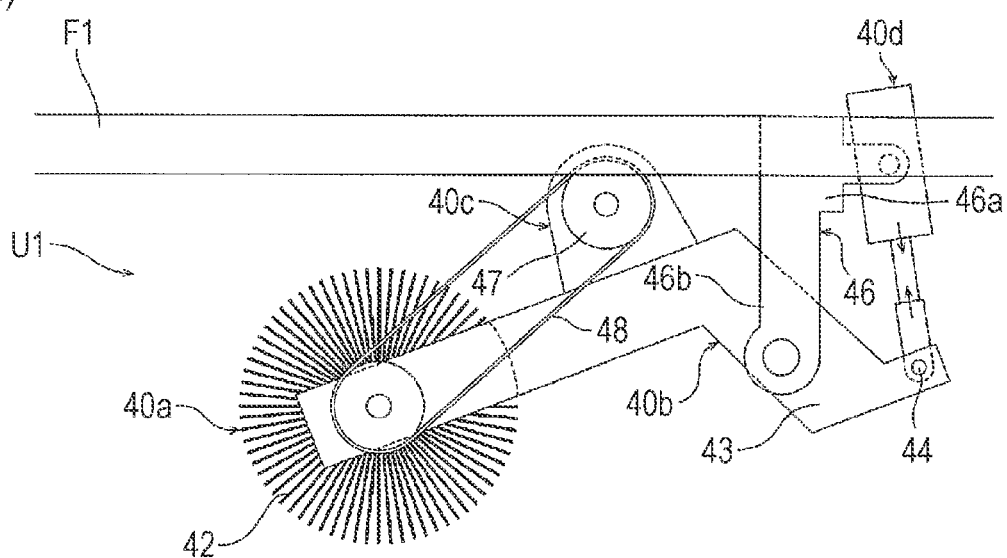

FIG. 6
(a)
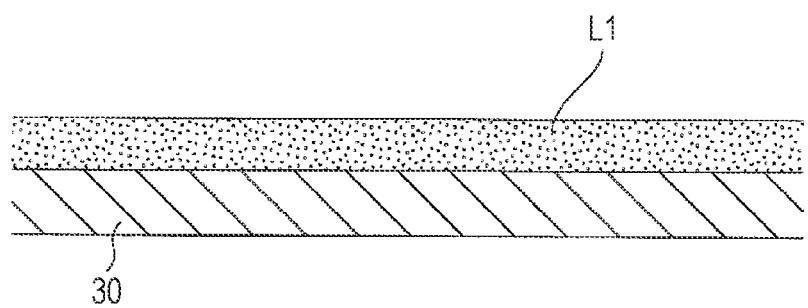
(b)
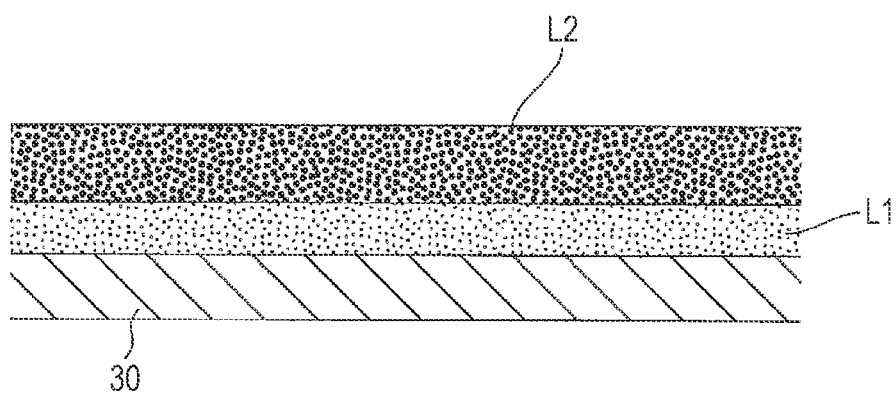

FIG. 10
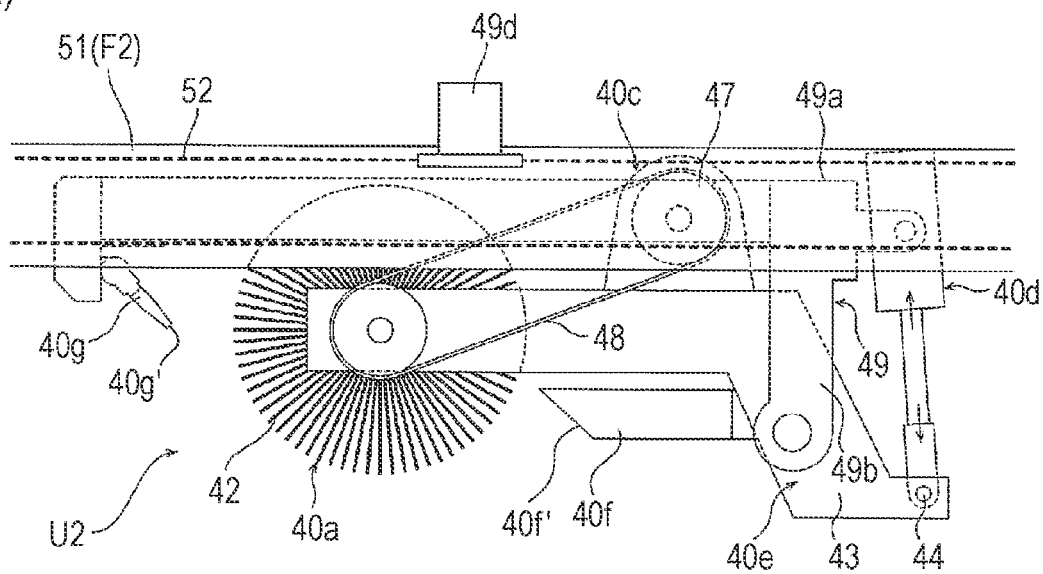
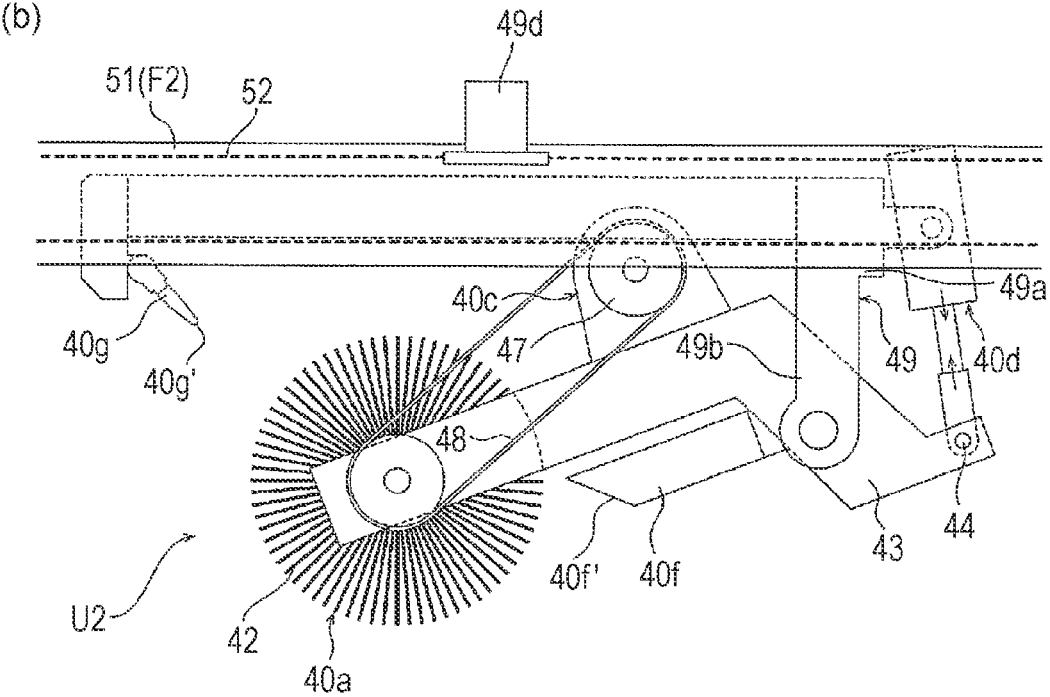

BUILDING MATERIAL MANUFACTURING APPARATUS

TECHNICAL FIELD

The present invention relates to an apparatus for manufacturing a building material, such as a board material for building.

BACKGROUND ART

Examples of building materials for constructing exterior walls and interior walls of buildings include inorganic boards, such as fiber reinforced cement siding boards and ceramic boards, fiber boards, such as particle boards, and resin boards.

As a method for manufacturing these various building materials, there is known a technique of performing a step of forming a raw material mat by, while screening by winnowing a powdery raw material that is a building raw material, depositing on a receiving member or the like a raw material of a predetermined size that has been screened (mat formation step), and of performing a step of heat-pressing the raw material mat. A building material manufacturing method using such a technique is described in, for example, Patent Literature 1 below.

CITATION LIST

Patent Literature

PTL 1: Japanese Unexamined Patent Application Publication No. 7-124926

SUMMARY OF INVENTION

Technical Problem

A conventional apparatus for performing the above-described mat formation step includes, for example, a screen part that performs screening by a winnowing method, a raw material supply part for supplying a powdery raw material by dropping the powdery raw material toward the screen part, and a receiving member for receiving a raw material of a predetermined size that has been screened. The powdery raw material that is used is a material in which a proper quantity of water has been added to a powdered solid that is a building material constituent material.

The screen part includes a blower for blowing air in a lateral direction against the powdery raw material that drops, and a screen net that is disposed at a position facing the air from the blower and that is inclined by a predetermined amount so as to extend away from the blower with decreasing distance from an upper side of the screen net. When the apparatus operates, the powdery raw material is dropped from the raw material supply part toward a location between the blower and the screen net, air is blown toward the screen net from the blower, and a part of the powdery raw material passes through the screen net or its screen mesh and further drops and is received by the receiving member (the other part drops without passing through the screen net). Then, the part of the powdery raw material that has passed through the screen net is deposited on the receiving member to thereby form a raw material mat.

At the screen part of the conventional building material manufacturing apparatus having such a mechanism, during the operation of the apparatus, while the powdery raw material that is damp and that has an adhesive property is pressed by the air from the blower, the powdery raw material is screened at the screen mesh of the screen net. In such screening using the winnowing method, the powdery raw material tends to adhere to the screen net, and, thus, the screen net tends to be clogged. When the powdery raw material includes a hydraulic material, such as cement, the powdery raw material adhered to the screen net is dried by the air blowing against the powdery raw material and tends to harden, as a result of which the screen net tends to be clogged. Such clogging requires, for example, time and effort to maintain the screen net, which is not desirable.

The present invention has been arrived at based on such circumstances, and an object of the present invention is to provide a building material manufacturing apparatus that is suitable for suppressing clogging of a screen that screens a building raw material.

Solution to Problem

A building material manufacturing apparatus that is provided by the present invention includes a screen part and a cleaning mechanism part. The screen part includes at least one screen sheet that has an inclination and that has a screen mesh. When the screen part includes a plurality of sheets, such as a plurality of screen sheets, the plurality of sheets each have an inclination and are disposed side by side in a direction of the inclination. The cleaning mechanism part includes a scraping part. When the apparatus operates in a building material manufacturing mode in which a building raw material is supplied to the screen sheet and the screen sheet is performing a wave motion, the scraping part is separated from the screen sheet. When the apparatus operates in a cleaning mode in which the building raw material is not supplied to the screen sheet and the screen sheet is not performing a wave motion, the scraping part rotates in contact with the screen sheet.

When the present apparatus operates in the building material manufacturing mode, with the at least one screen sheet of the screen part performing a wave motion, the building raw material, such as a powdery raw material, is supplied to the screen part by, for example, being dropped. The wave motion of a sheet, such as a screen sheet, refers to, for example, a wave motion having an antinode at which the sheet repeatedly vibrates in a thickness direction thereof, and having a higher speed with decreasing period of the vibration. Such a wave motion is, for example, realized by operating a vibrator, such as an eccentric vibrator, that is connected to the sheet via a predetermined power transmission mechanism.

When the present apparatus operates in the building material manufacturing mode, the building raw material that has been supplied to the screen part is screened at the inclined screen sheet while descending along the sheet (the screen sheet continues performing the wave motion). By depositing on the predetermined receiving member a part, which has passed through the screen mesh of the screen sheet, of the building raw material that is produced by the screening at the screen part, it is possible to form a raw material mat. By performing the heat-pressing step on the raw material mat, a predetermined building material, serving as a board material, is manufactured.

When the present apparatus operates in the building material manufacturing mode, the above-described structure in which the screen sheet for screening the building raw material performs a wave motion is suitable in suppressing the building raw material from adhering to the screen sheet, and, thus, is suitable in suppressing clogging of the screen mesh of the screen sheet.

In addition, the above-described structure in which the present building material manufacturing apparatus includes the cleaning mechanism part including the scraping part that is rotatable in contact with the screen sheet when the apparatus operates in the cleaning mode is suitable for removing the building raw material adhered to the screen sheet from the screen sheet, and, thus, is suitable for suppressing clogging of the screen mesh of the screen sheet. The above-described structure in which the scraping part is separated from the screen sheet when the apparatus operates in the building material manufacturing mode is suitable in causing the screen sheet to perform a proper wave motion and properly operating the present apparatus in the building material manufacturing mode.

As described above, the present building material manufacturing apparatus is suitable for suppressing clogging of the screen sheet or a screen that screens the building raw material.

Desirably, when the apparatus operates in the cleaning mode, the scraping part is movable in a direction of the inclination of the screen sheet while rotating in contact with the screen sheet. Such a structure is suitable for rotating the scraping part in contact with the screen sheet while applying a proper pressure to the screen sheet by the scraping part and, thus, is desirable in suppressing clogging of the screen mesh of the screen sheet. In addition, this structure is suitable for reducing the number of scraping parts to be provided for cleaning the entire one or two or more screen sheets.

Desirably, the scraping part includes a rotatable shaft part and a brush for being brought into contact with the screen sheet, the brush being mounted on the shaft part. More desirably, the brush is mounted spirally around the shaft part. Since the brush having such structures easily enters the screen mesh of the screen sheet when the brush rotates in contact with the screen sheet, the brush is desirable in removing the building raw material adhered to the screen sheet from the screen sheet, and, thus, is desirable in suppressing clogging of the screen mesh of the screen sheet.

Desirably, the cleaning mechanism part includes a base structural part that is disposed to oppose the screen part, and a connection structural part that connects the base structural part and the scraping part, and that, when the apparatus operates in the cleaning mode, is capable of causing the scraping part to be displaced to contact the screen sheet. Alternatively, it is possible to, due to relative movement of the screen part and the cleaning mechanism part, bring the scraping part into contact with the screen sheet when the apparatus operates in the cleaning mode. Such structures are suitable for, in the present apparatus, realizing both a separation disposition state in which the screen part and the cleaning mechanism part are separated from each other when the apparatus operates in the building material manufacturing mode and a contact disposition state in which the scraping part of the cleaning mechanism part is in contact with the screen part when the apparatus operates in the cleaning mode.

Desirably, the cleaning mechanism part includes a blowing part for blowing air toward the scraping part, the blowing part being provided on an upper side of the scraping part in a direction of the inclination of the screen sheet. Such a structure is suitable for suppressing a reduction in scraping efficiency occurring when the building raw material that has been removed from the screen sheet by the scraping part adheres to the scraping part. In addition, such a structure is suitable for, when the screen part includes a coarse-mesh screen sheet on a lower side of the blowing part in the direction of the inclination of the screen sheet, sending the building raw material that has been removed from the screen sheet by the scraping part to the coarse-mesh screen sheet by the blowing part, and dropping the building raw material from the screen mesh of the coarse-mesh screen sheet. Therefore, the structure is suitable for suppressing the building raw material that has been removed from the screen sheet by the scraping part from remaining on the screen sheet.

Desirably, the cleaning mechanism part includes a suction part for sucking the building raw material that is scraped from the screen sheet by the scraping part. More desirably, the suction part is positioned on a lower side of the scraping part in a direction of the inclination of the screen sheet. These structures are suitable for discharging the building raw material that has been removed from the screen sheet by the scraping part to the outside of the screen part or the outside of the present building material manufacturing apparatus. Such structures are also suitable for suppressing the building raw material that has been removed from the screen sheet by the scraping part from flying.

BRIEF DESCRIPTION OF DRAWINGS

FIG. 4 is a side view showing an example of a scraping unit of the building material manufacturing apparatus shown in FIG. 1.

FIG. 6 is a partial sectional view of a stacking formation mode of a mat on a receiving member of the building material manufacturing apparatus shown in FIG. 1.

FIG. 10 is a side view of a scraping unit of the building material manufacturing apparatus shown in FIG. 9.

DESCRIPTION OF EMBODIMENTS

Figure 1:
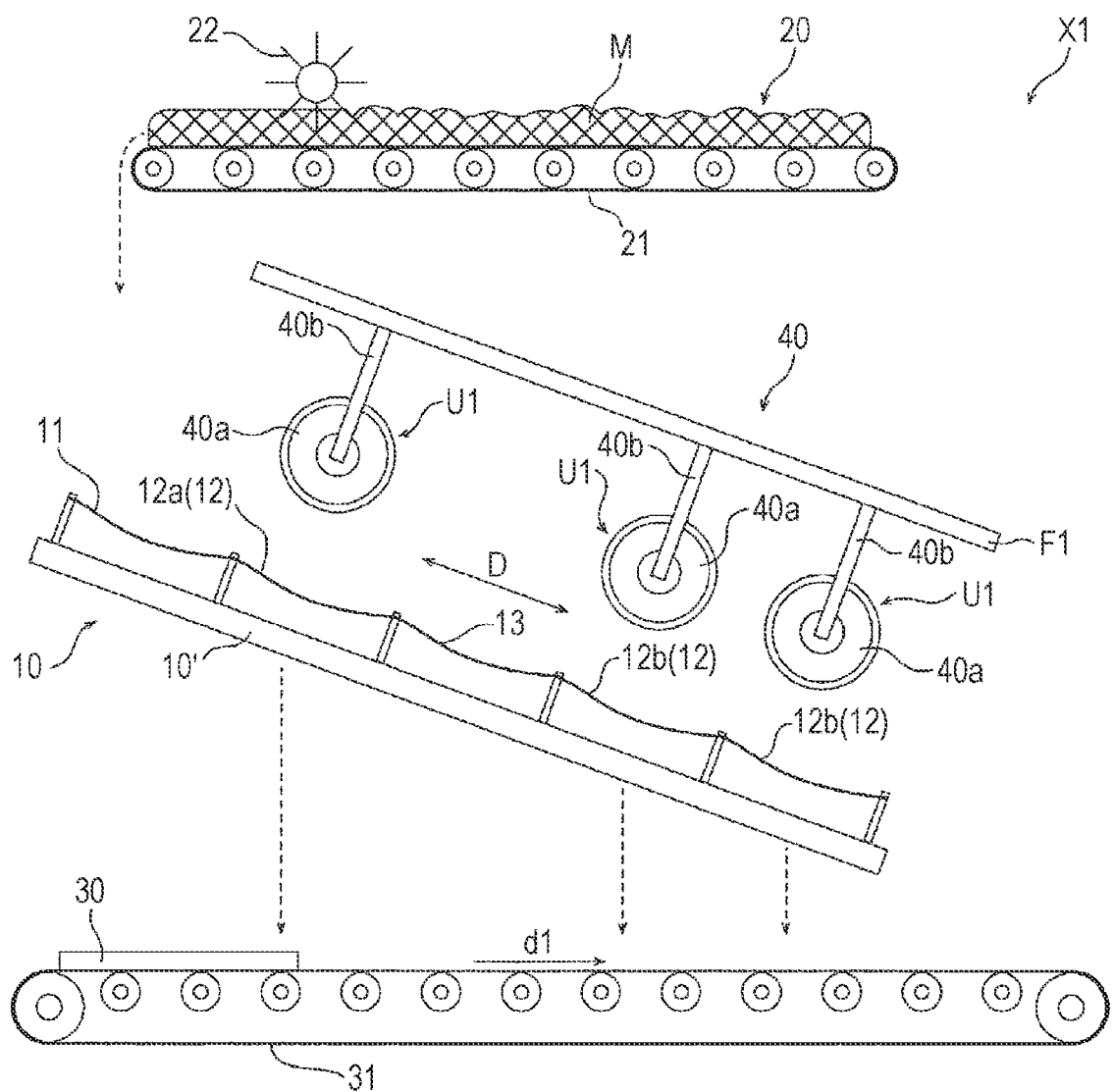
FIG. 1 is a schematic structural view of a building material manufacturing apparatus according to a first embodiment of the present invention, and shows the apparatus in a building material manufacturing mode.

FIG. 1 shows a schematic structure of a building material manufacturing apparatus X1 according to a first embodiment of the present invention. The building material manufacturing apparatus X1 is an apparatus that includes a screen part 10, a raw material supply part 20, a receiving member 30, and a cleaning mechanism part 40, and that is capable of forming a building material mat, which becomes a building material after a heat-pressing step, by depositing a building raw material of a predetermined size. The building material manufacturing apparatus X1 is operatable in a building material manufacturing mode (described later) for forming such a mat, and is configured to be operatable even in a cleaning mode (described below).

The screen part 10 includes at least one screen sheet that is inclined and that has a screen mesh, and causes the at least one screen sheet to perform a wave motion when the building material manufacturing apparatus X1 operates in the building material manufacturing mode (when the building material manufacturing apparatus X1 operates in the building material manufacturing mode, a building raw material M is supplied to the at least one screen sheet 12 and the at least one screen sheet 12 performs a wave motion). In the present embodiment, specifically, the screen part 10 includes sheets that are inclined and that are disposed side by side in a direction of the inclination (inclination direction D), and a body structural part 10'. The body structural part 10' has the sheets mounted thereon, and is provided for realizing the wave motion of each sheet when the apparatus operates in the building material manufacturing mode. The wave motion of the sheets is a wave motion having an antinode at which the sheets repeatedly vibrate in a thickness direction thereof, and having a higher speed with decreasing period of the vibration.

In the present embodiment, the sheets of the screen part 10 include a receive-send sheet 11, the screen sheets 12 (screen sheet 12a, screen sheets 12b), and a relay sheet 13. Each sheet is an elastic sheet having elasticity, and is desirably a urethane-based rubber sheet. The thickness of each sheet is, for example, 2 to 5 mm. The inclination of the sheets of the screen part 10 is, for example, 6 to 25 degrees with respect to the horizontal.

Figure 2:
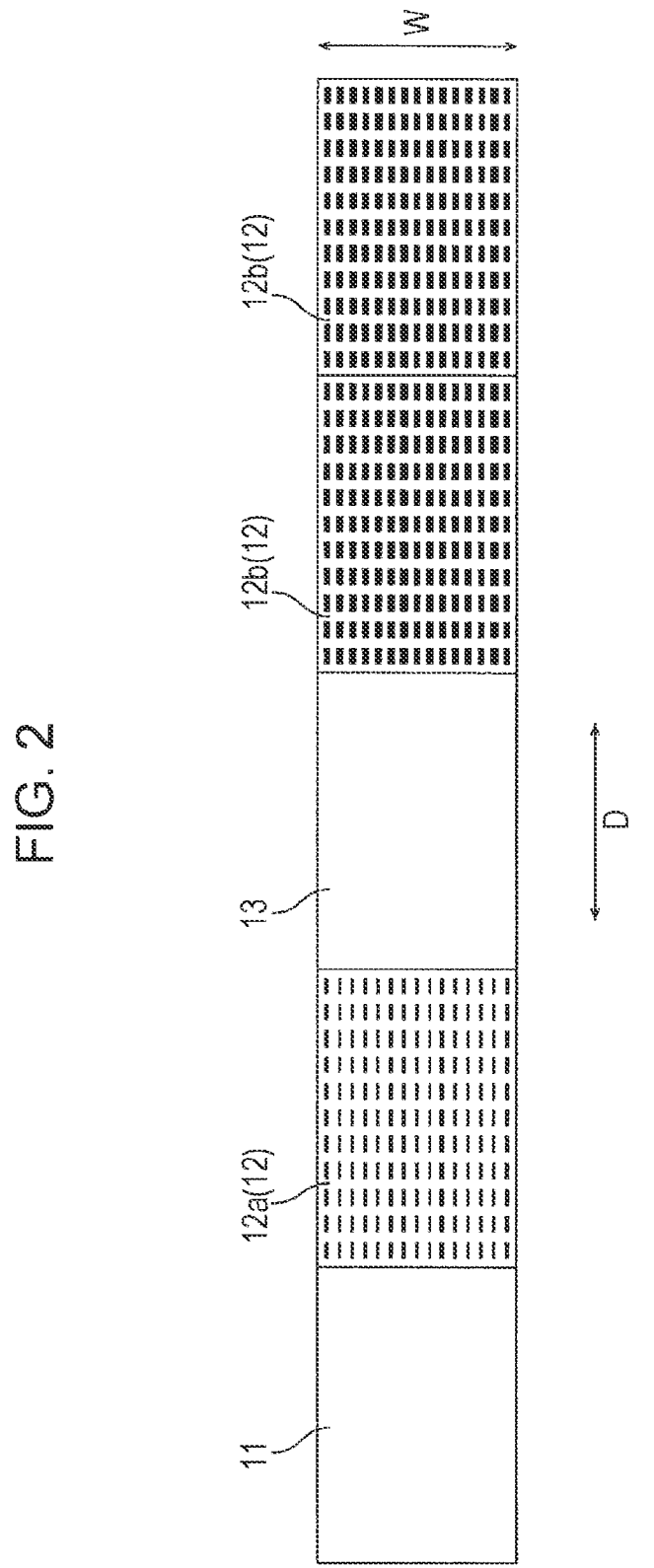
FIG. 2 is a sheet arrangement diagram of the building material manufacturing apparatus shown in FIG. 1.

FIG. 2 shows an arrangement of the sheets of the present embodiment. The sheets of the present embodiment are such that the receive-send sheet 11, the screen sheet 12a, the relay sheet 13, the screen sheet 12b, and the screen sheet 12b are disposed side by side in this order from an upper end side of the sheets.

The receive-send sheet 11 is a non-screen-mesh sheet not having a screen mesh, and is positioned at an upper end of the sheets. The receive-send sheet 11 is a sheet that receives a raw material that has been dropped when the building material manufacturing apparatus X1 operates in the building material manufacturing mode.

The screen sheet 12a is a fine-mesh screen sheet having a screen mesh that is smaller than that of each screen sheet 12b, and is positioned on a lower side of the receive-send sheet 11. The size, that is, the opening size of the screen mesh of the screen sheet 12a is, for example, 1 to 30 mm.

Each screen sheet 12b is a coarse-mesh screen sheet having a screen mesh that is larger than that of the screen sheet 12a, and is positioned on a lower side of the screen sheet 12a. The size, that is, the opening size of the screen mesh of each screen sheet 12b is, for example, 30 to 50 mm.

The relay sheet 13 is a non-screen-mesh sheet not having a screen mesh, and is positioned between the fine-mesh screen sheet 12a and each coarse-mesh screen sheet 12b.

The above-described body structural part 10' includes an inner frame structural body, an outer frame structural body, and an eccentric vibrator.

The inner frame structural body includes a pair of inner side plates that extend in parallel, and a plurality of cross beams (first cross beams) that extend in a direction of separation of these inner side plates and that bridge a gap between the inner side plates. Each first cross beam includes a sheet fixing part on an upper end side thereof.

The outer frame structural body includes a pair of outer side plates that extend in parallel along the inner side plates on outer sides of the above-described respective inner side plates, and a plurality of cross beams (second cross beams) that extend in a direction of separation of these outer side plates and that bridge a gap between the outer side plates. Each second cross beam includes a sheet fixing part on an upper end side thereof.

The inner frame structural body and the outer frame structural body are disposed in an arrangement in which the upper end side (together with the sheet fixing part) of each first cross beam of the inner frame structural body and the upper end side (together with the sheet fixing part) of each second cross beam of the outer frame structural body are alternately disposed side by side in parallel, and the outer frame structural body or the pair of outer side plates are suspended by a support-plate spring (not shown) with respect to the inner frame structural body or the pair of inner side plates. Together with the outer frame structural body in this way, the inner frame structural body is installed via vibration-proof rubber (not shown) on a base (not shown) having a predetermined inclination.

The inner frame structural body and the outer frame structural body are connected to the eccentric vibrator (not shown), serving as a vibrational source, via a drive-plate spring. Specifically, the inner frame structural body and the outer frame structural body are connected to the eccentric vibrator via the drive-plate spring so that the inner frame structural body and the outer frame structural body reciprocate with a phase difference of 180 degrees by rotational driving of the eccentric vibrator. The rotational drive speed of the eccentric vibrator when the apparatus operates is, for example, 500 to 600 rotations/minute.

The above-described sheets of the screen part 10 are each fixed to the first and second cross beams that are adjacent to each other. Specifically, one end of each sheet is fixed to the sheet fixing part of the first cross beam, and the other end of each sheet is fixed to the sheet fixing part of the second cross beam adjacent to the first cross beam.

An example of such a body structural part 10' of the screen part 10, that is, a mechanism that produces a wave motion in the sheets of the screen part 10 is a main body of a screening machine manufactured by URAS TECHNO CO., LTD. (JUMPING SCREEN (registered tradename)).

The raw material supply part 20 is a part for dropping a building raw material M toward the receive-send sheet 11 inside the screen part 10 and supplying the raw material to the screen part 10, and includes a belt conveyor 21 and a leveling part 22.

The belt conveyor 21 is a conveyor for sending the building raw material M to a location above the receive-send sheet 11 of the screen part 10. The leveling part 22 is a rotation structural part for leveling the building raw material M that is sent onto the belt conveyor 21, and a plurality of gapped teeth stand at a rotation peripheral end thereof. In the present embodiment, the rotation peripheral end of the leveling part 22 opposes the belt conveyor 21, and the leveling part 22 is disposed so that a rotation axis of the leveling part 22 is orthogonal to a sending direction of sending the building raw material M by the belt conveyor 21.

From the viewpoint of suppressing/preventing the building material manufacturing apparatus X1 from increasing in size and the entire facility including the building material manufacturing apparatus X1 from becoming a large-scale facility, it is desirable that the raw material supply part 20 be disposed above the screen part 10 so that the belt conveyor 21 extends along a horizontal component of an arrangement direction of the sheets of the screen part 10.

In the present embodiment, in a width direction W (a direction orthogonal to the arrangement direction of the sheets and the inclination direction D) shown in FIG. 2, the receive-send sheet 11 of the above-described screen part 10 extends in a range that is the same as a dropping region of the building raw material M that is dropped from the raw material supply part 20, or extends beyond the dropping region.

The receiving member 30 is a member for receiving a predetermined building raw material M that has passed through the screen part 10, and is placed on a belt conveyor 31 that forms a movement line of the receiving member 30. The receiving member 30 moves due to the movement of the belt conveyor 31.

The cleaning mechanism part 40 is a part that functions when the building material manufacturing apparatus X1 operates in the cleaning mode, and, as shown in schematically in FIG. 1, includes a base structural part F1 that is disposed to oppose the screen part 10, and scraping units U1 (when the building material manufacturing apparatus X1 operates in the cleaning mode, the building raw material M is not supplied to the screen sheets 12, and the screen sheets 12 do not perform a wave motion). The base structural part F1 is a part for supporting other elements of the cleaning mechanism part 40, and is fixed to, for example, the body structural part 10' of the screen part 10 (not shown). The scraping units U1 each include at least a scraping part 40*a* and a connection structural part 40*b*. One scraping unit U1 is provided for each screen sheet 12 described above of the screen part 10.

Figure 3:
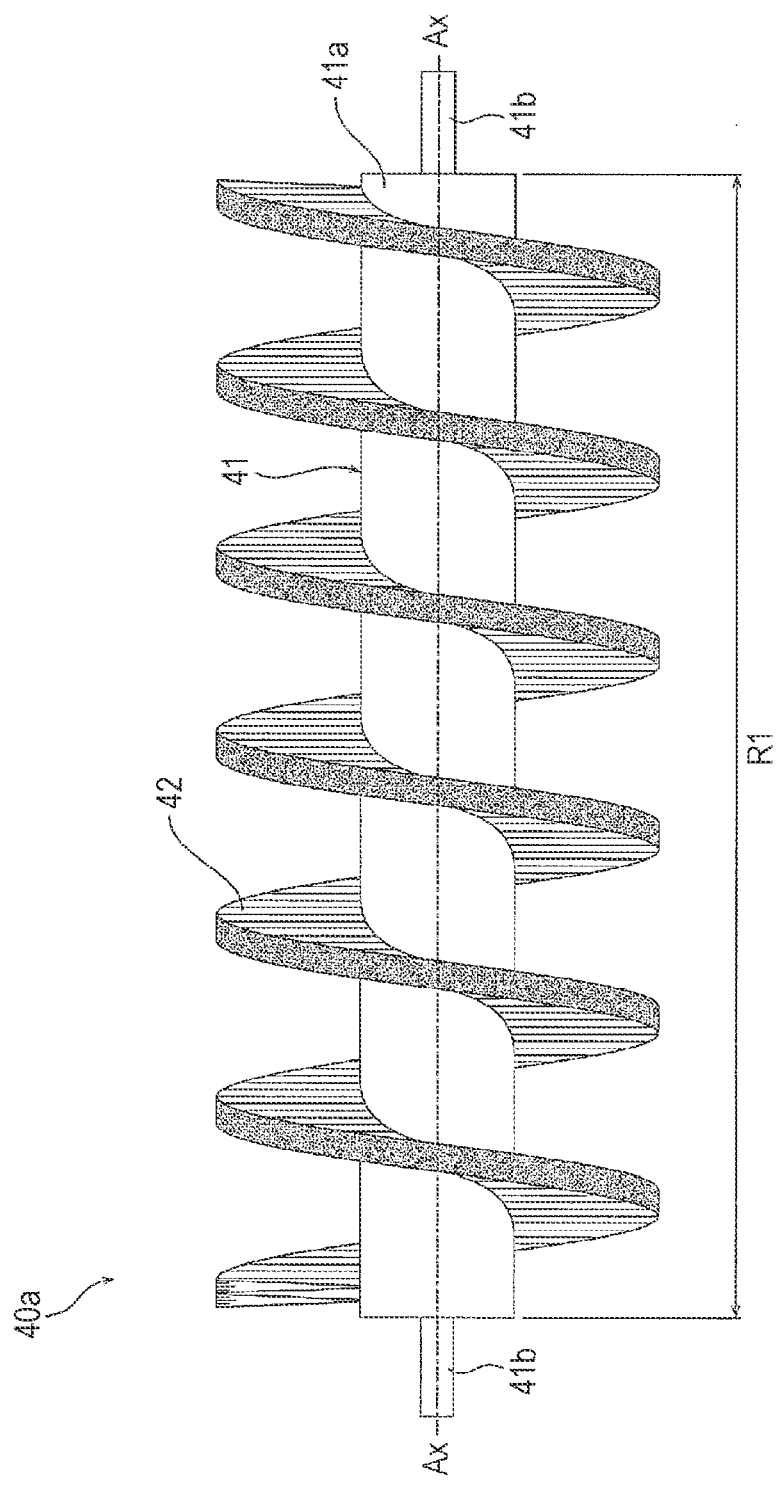
FIG. 3 shows a scraping part of a cleaning mechanism part.

Each scraping part 40*a* is a part for removing from the corresponding screen sheet 12 the building raw material M adhered to the corresponding screen sheet 12. In the building material manufacturing apparatus X1, each scraping part 40*a* is configured to be rotatable in contact with the corresponding screen sheet 12 when the apparatus operates in the cleaning mode. When the apparatus operates in the building material manufacturing mode, each scraping part 40*a* is separated from the corresponding screen sheet 12 as shown in FIG. 1. As shown in FIG. 3, each scraping part 40*a* includes a shaft part 41 and a brush 42 for being brought into contact with the corresponding screen sheet, and is configured to be rotationally drivable by a predetermined drive mechanism (not shown).

Each shaft part 41 includes a cylindrical main body 41*a* and a shaft 41*b*. A length R1 shown in FIG. 3 of the main body 41*a* is desirably essentially equivalent to the length in the width direction W of each sheet described above of the screen part 10. When each scraping part 40*a* is rotationally driven by the driving mechanism, the corresponding shaft part 41 rotates around an axis Ax.

Each brush 42 is mounted on the corresponding shaft part 41 or the corresponding main body 41*a*. Specifically, each brush 42 is mounted on the main body 41*b* of the corresponding shaft part 41 so that a plurality of pieces of brush hair that stand so as to extend in a vertical direction of a cross section of the corresponding cylindrical main body 41*a* forms a spiral around the corresponding main body 41*a*. The pieces of brush hair are made of, for example, a metal or a resin. The length of each piece of brush hair is, for example, 5 to 15 cm. The diameter of each piece of brush hair is, for example, 0.3 to 1.0 mm.

In the building material manufacturing apparatus X1, for example, each connection structural part 40*b* is configured to stretch and contract to move the corresponding scraping part 40*a* upward and downward. In this case, by the stretching and the contraction of each connection structural part 40*b*, a separation disposition state shown in FIG. 1 in which the screen part 10 and the cleaning mechanism part 40 are separated from each other when the apparatus operates in the building material manufacturing mode and a contact disposition state shown in FIG. 7 in which each scraping part 40*a* of the cleaning mechanism part 40 is in contact with the screen part 10 when the apparatus operates in the cleaning mode are realized.

In the building material manufacturing apparatus X1, it is possible to, due to relative movement in an up-down direction of the screen part 10 and the base structural part F1 of the cleaning mechanism part 40 opposing the screen part 10, bring each scraping part 40*a* into contact with the corresponding screen sheet 12 when the apparatus operates in the cleaning mode. That is, it is possible to, due to the relative movement in the up-down direction of the screen part 10 and the base structural part F1 of the cleaning mechanism part 40 opposing the screen part 10, realize the separation disposition state in which the screen part 10 and the cleaning mechanism part 40 are separated from each other when the apparatus operates in the building material manufacturing mode and the contact disposition state in which each scraping part 40*a* of the cleaning mechanism part 40 is in contact with the screen part 10 when the apparatus operates in the cleaning mode. In the relative movement, the base structural part F1 of the cleaning mechanism part 40 may move upward and downward with respect to the screen part 10, or the screen part 10 may move upward and downward with respect to the base structural part F1 of the cleaning mechanism part 40.

Figure 5:
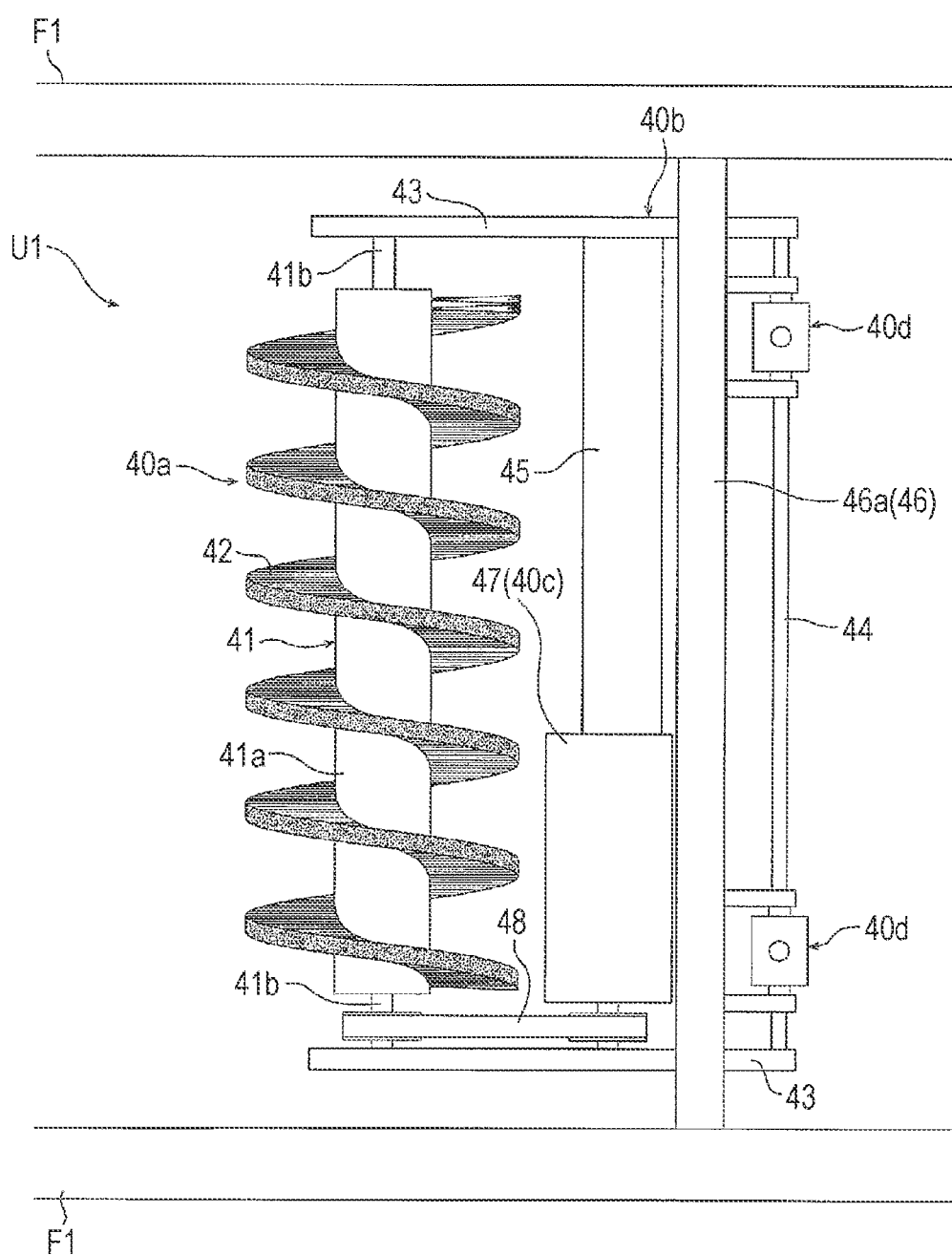
FIG. 5 is a plan view showing the example of the scraping unit of the building material manufacturing apparatus shown in FIG. 1.

The cleaning mechanism part 40 of the building material manufacturing apparatus X1 may include a scraping unit U1 having the structure shown in each of FIGS. 4 and 5. The scraping unit U1 shown in FIGS. 4 and 5 includes the above-described scraping part 40*a*, a connection structural part 40*b* having a predetermined structure, a scraping drive part 40*c*, and a displacement drive part 40*d*.

The connection structural part 40*b* of the scraping unit U1 shown in FIGS. 4 and 5 is a part that mechanically connects the above-described scraping part 40*a* to the base mechanism part F1, and includes a pair of arm parts 43, a bar 44, a motor support part 45, and a bridge connection part 46.

The scraping part 40*a* is disposed between the pair of arm parts 43. Specifically, the pair of arm parts 43 rotatably support the scraping part 40*a* via the shaft 41*b* of the shaft part 41 thereof. The bar 44 extends in a direction of separation of the pair of arm parts 43 between the pair of arm parts 43, and is connected to a right end portion in FIG. 5 of each arm part 43. The motor support part 45 extends in the direction of separation of the pair of arm parts 43 between the pair of arm parts 43, and is connected to each arm part 43. In plan view of FIG. 5, the motor support part 45 is positioned between the scraping part 40*a* and the bar 44. The bridge connection part 46 includes a bridge main part 46*a* and two downwardly extending parts 46*b*. The bridge main part 46*a* is connected to the base structural part F1. As shown in FIG. 4, each downwardly extending part 46*b* extends downward from the bridge main part 46*a* and, at its lower end portion, rotatably supports the corresponding arm part 43.

The scraping drive part 40*c* includes a motor part 47 for producing power for rotationally driving the shaft part 41 of the scraping part 40*a*, and a power transmission belt 48 for transmitting the power to the shaft part 41. The motor part 47 is disposed at the above-described motor support part 45.

The displacement drive part 40*d* is an element for producing power for causing the connection structural part 40*b* to be displaced, and, in the present embodiment, includes a stretchable and contractable cylinder mechanism. The bar 44 is rotatably connected to a lower end portion in FIG. 4 of the displacement drive part 40*d*, and, as shown in FIG. 5, an upper end side in FIG. 4 of the displacement drive part 40*d* is rotatably connected to the bridge main part 46*a* of the bridge connection part 46.

In the scraping unit U1 having these structures (the scraping unit U1 shown in FIGS. 4 and 5), due to an operation of the motor part 47 of the scraping drive part 40*c*, the shaft part 41 and the brush 42 of the scraping part 40*a* rotate. Due to stretching of the cylinder mechanism of the displacement drive part 40*d*, the arm parts 43 change their orientation and the scraping part 40*a* or the brush 42 is displaced upward (displaced to, for example, the position shown in FIG. 4(*a*)) via the orientation change. Due to contraction of the cylinder mechanism of the displacement drive part 40*d*, the arm parts 43 change their orientation and the scraping part 40*a* or the brush 42 is displaced downward (displaced to, for example, the position shown in FIG. 4(*b*)) via the orientation change.

In the building material manufacturing apparatus X1 in which the scraping unit U1 shown in FIGS. 4 and 5 includes the cleaning mechanism part 40, due to displacement of the connection structural part 40*b* that connects the base structural part F1 and the scraping part 40*a* (to the state shown in FIG. 4(*b*) from the state shown in FIG. 4(*a*)), the scraping part 40*a* comes into contact with the screen sheets 12 when the apparatus operates in the cleaning mode. That is, due to the displacement of the connection structural part 40*b*, the separation disposition state shown in FIG. 1 in which the screen part 10 and the cleaning mechanism part 40 are separated from each other when the apparatus operates in the building material manufacturing mode and the contact disposition state shown in FIG. 7 in which the scraping part 40*a* of the cleaning mechanism part 40 is in contact with the screen part 10 when the apparatus operates in the cleaning mode are realized.

When the building material manufacturing apparatus X1 having the structure above operates in the building material manufacturing mode, in the body structural part 10' of the screen part 10, the eccentric vibrator is rotationally driven and the inner frame structural body and the outer frame structural body reciprocate. The phase difference of both the reciprocating motions is 180 degrees as mentioned above. When the inner frame structural body and the outer frame structural body reciprocate in this way, each sheet performs a wave motion as a result of repeatedly alternating between a state of being strongly pulled by the above-described first and second cross beams and a slack state. As the rotational drive speed of the eccentric vibrator increases, the speed of the wave motion of each sheet is also increased.

When the building material manufacturing apparatus X1 operates in the building material manufacturing mode, the building raw material M is continuously supplied to the raw material supply part 20 from a raw material storage part (not shown). The building raw material M is prepared in accordance with the building material to be manufactured. When the building material to be manufactured is, for example, a fiber reinforced cement siding board, the building raw material M includes, for example, a hydraulic material and a reinforcing material, or may include, for example, a siliceous material, a hollow body, an admixture, or a waterproofing agent.

Examples of hydraulic material include cement, gypsum, and slag. Examples of cement include ordinary portland cement, high-early-strength portland cement, alumina cement, blast-furnace slag cement, and fly-ash cement. Examples of gypsum include anhydrous gypsum, hemihydrate gypsum, and dihydrate gypsum. Examples of slag include blast furnace slag and converter slag.

Examples of reinforcing material include plant-based reinforcing material and synthetic fiber. Examples of plant-based reinforcing material include wood flour, wood wool, a wood chip, wood pulp, wood fiber, a wood fiber bundle, wastepaper, bamboo fiber, hemp fiber, bagasse, rice husk, and rice straw. Examples of synthetic fiber include polyester fiber, polyamide fiber, polyethylene fiber, polypropylene fiber, and acrylic fiber.

Examples of siliceous material include quartz sand, silica rock powder, silica powder, coal ash, fly ash, and diatomaceous earth.

Examples of hollow body include an expandable polystyrene bead, microsphere, perlite, fly-ash balloon, Shirasu balloon, expansive shale, expansive clay, and burned diatomaceous earth. An example of microsphere is acrylic foam.

Examples of admixture include mica, paper sludge incineration ash, silica fume, wollastonite, calcium carbonate, magnesium hydroxide, aluminum hydroxide, vermiculite, sepiolite, xonotlite, kaolinite, and zeolite.

Examples of admixture also include pulverized products of inorganic boards, such as fiber reinforced cement siding boards. Examples of pulverized products of inorganic boards include pulverized products of defective inorganic boards prior to hardening and pulverized products of defective inorganic boards after the hardening, which are produced in the process of manufacturing inorganic boards, and cut-piece of inorganic boards and pulverized products of waste material, which are produced at, for example, a building site.

Examples of waterproofing agent include natural wax, wax, paraffin, succinic acid, fatty acid, silicone, and synthetic resin. Examples of synthetic resin include acrylic resin, polyethylene, ethylene-vinyl acetate copolymer, urethane-based resin, and epoxy resin.

The building raw material M that has been supplied to the raw material supply part 20 of the building material manufacturing apparatus X1 is sent at, for example, a certain speed to a location above the receive-send sheet 11 of the screen part 10 by the belt conveyor 21. On the belt conveyor 21, the building raw material M is leveled by the rotating leveling part 22 or the gapped teeth thereof.

When the building material manufacturing apparatus X1 operates, with the sheets of the screen part 10 each performing a wave motion, the building raw material M is dropped toward the receive-send sheet 11 of the screen part 10 from the raw material supply part 20 (a raw material drop path from the raw material supply part 20 is shown by a broken arrow).

The building raw material M that is dropped from the raw material supply part 20 includes a building raw material in the form of a coarse lump. Such a building raw material M is received first at the screen part 10 by the receive-send sheet 11 not having a screen mesh and having a large raw material contact area. Such a structure is suitable for, before the building raw material M in the form of a coarse lump reaches the screen sheets 12 of the screen part 10, crushing the building raw material M by collision with the receive-send sheet 11 that performs a wave motion. The more the crushing of the building raw material M progresses before the building raw material M reaches the screen sheets 12 of the screen part 10, the more the clogging of the screen sheets 12 tends to be suppressed.

In addition, the structure in which the building raw material M that is dropped from the raw material supply part 20 can be received first at the screen part 10 by the receive-send sheet 11 not having a screen mesh and having a large raw material contact area is suitable for, before the building raw material M reaches the screen sheets 12 of the screen part 10, distributing the building raw material M in the width direction W of the sheets by collision with the receive-send sheet 11 that performs a wave motion. The more the building raw material M is distributed before reaching the screen sheets 12 of the screen part 10, the more the clogging of the screen sheets 12 tends to be suppressed.

When the apparatus operates in the building material manufacturing mode, the building raw material M that has been crushed and distributed as described above at the receive-send sheet 11 that performs a wave motion moves downward along the inclined sheets including the receive-send sheet 11, specifically, moves along the screen sheets 12 from the receive-send sheet 11, and is screened by the screen sheets 12 having a screen mesh (each sheet continues performing a wave motion). By depositing on the receiving member 30 a part, which has passed through the screen meshes of the screen sheets 12, of the building raw material M that is produced by screening at the screen part 10, a raw material mat is formed (raw material drop paths from the screen part 10 are shown by broken arrows). According to the building material manufacturing apparatus X1, it is possible to obtain particle-distribution raw materials for two sections from the building raw material M by the above-described screening operation and to form, for example, a raw material mat having a two-layer structure. The details are as follows.

First, a predetermined amount of a part of the building raw material M that has passed through the screen mesh of the screen sheet 12a (a part of building raw material M that has passed through the screen mesh of the screen sheet 12a) is deposited on the receiving member 30 that is passing directly below the screen sheet 12a of the screen part 10 by being carried in the direction of arrow d1 by the belt conveyor 31. Therefore, a layer L1 that is formed by depositing a relatively fine building raw material M that has passed through the screen sheet 12a having a fine mesh is formed on the receiving member 30 as shown in FIG. 6(a). The receiving member 30 is, for example, a template having an inner surface (a surface on a side that receives the building raw material M) having an irregular form corresponding to a design surface of the building material to be manufactured.

Then, a predetermined amount of a part of the building raw material M that has passed through the screen mesh of the screen sheet 12b (a part of building raw material M that has passed through the screen mesh of the screen sheet 12b) is deposited on the layer L1 at the receiving member 30 that is passing directly below the screen sheet 12b of the screen part 10 by being carried in the direction of arrow d1 by the belt conveyor 31. Therefore, a layer L2 that is formed by depositing a relatively coarse building raw material M that has passed through the screen sheet 12b having a coarse mesh is formed on the layer L1 as shown in FIG. 6(b).

Thereafter, a layered body including the layers L1 and L2 is heat-pressed (heat-pressing step). In this step, the press pressure is, for example, 2 to 8 MPa, the heating temperature is, for example, 50 to 80° C., and the press time is 6 to 12 hours. Thereafter, autoclave curing is performed, if necessary. In the autoclave curing, the temperature condition is, for example, 150° C. or higher, and the pressure condition is, for example, 0.5 MPa or higher.

By subjecting the layered body including the layers L1 and L2 to the heat-pressing step or to the heat-pressing step and then the autoclave curing, a building material having a layered structure including a hardening layer formed from the layer L1 and a hardening layer formed from the layer L2 is manufactured. For example, when the building material to be manufactured is a fiber reinforced cement siding board and the above-described building raw material M includes a hydraulic material, a siliceous material, and a reinforcing material, each hardening layer has a reinforcing material dispersed in an inorganic hardening matrix that is made of the hydraulic material and the siliceous material.

Since the hardening layer that is formed from the layer L1, which is a deposit of the relatively fine building raw material M, has a fine structure, the hardening layer is suitable for obtaining high water resistance, and, thus, is suitable as a surface layer of the building material. Since the hardening layer that is formed from the layer L2, which is a deposit of the relatively coarse building raw material M, has a light structure having a low density, the hardening layer is suitable for obtaining high cushioning characteristics, and, thus, is suitable as a core layer of the building material.

As described above, the building material manufacturing apparatus X1 is suitable for manufacturing a building material while suppressing clogging of the screen sheets 12 of the screen part 10 for screening the building raw material M.

When the building material manufacturing apparatus X1 operates in the building material manufacturing mode, as described above, the screen sheets 12 for screening the building raw material M performs a wave motion. Such a structure is suitable in suppressing the building raw material M from adhering to the screen sheets 12, and, thus, is suitable in suppressing clogging of the screen meshes of the screen sheets 12.

As described above, in the width direction W of the sheets, the receive-send sheet 11 extends in the range that is the same as the dropping region of the building raw material M that is dropped from the raw material supply part 20, or extends beyond the dropping region. Such a structure is desirable in causing all of the building raw material M that is supplied from the raw material supply part 20 to be properly received by the screen part 10 or the receive-send sheet 11. In addition, the structure in which the receive-send sheet 11 is wider than the raw material dropping region is suitable for, before the building raw material M reaches the screen sheets 12 of the screen part 10, distributing the building raw material M in the width direction W of the sheets by collision with the receive-send sheet 11 that performs a wave motion. The more the building raw material M is distributed before reaching the screen sheets 12 of the screen part 10, the more the clogging of the screen sheets 12 tends to be suppressed.

As described above, the raw material supply part 20 includes the belt conveyor 21 for sending the building raw material M to a location above the receive-send sheet 11 of the screen part 10, and the leveling part 22 for leveling the building raw material M that is sent onto the belt conveyor 21. Such a structure is desirable in suppressing clogging of the meshes of the screen sheets 12 of the screen part 10. Specifically, the leveling operation by the leveling part 22 performed on the building raw material M that is sent onto the belt conveyor 21 of the raw material supply part 20 is suitable for equalizing the supply flow rate of the building raw material M that is dropped and supplied toward the receive-send sheet 11 from a terminal end of the belt conveyor 21, and, thus, is desirable in suppressing unevenness of the building raw material M on the sheets of the screen part 10 and in suppressing clogging of the screen sheets 12.

On the other hand, when the building material manufacturing apparatus X1 operates in the cleaning mode, in the screen part 10, the eccentric vibrator of the body structural part 10' is stopped to stop the wave motion of each sheet, and the supply of the building raw material M to the screen part 10 from the raw material supply part 20 is also stopped. In this state, the building material manufacturing apparatus X1 operates in the cleaning mode as follows.

Figure 7:
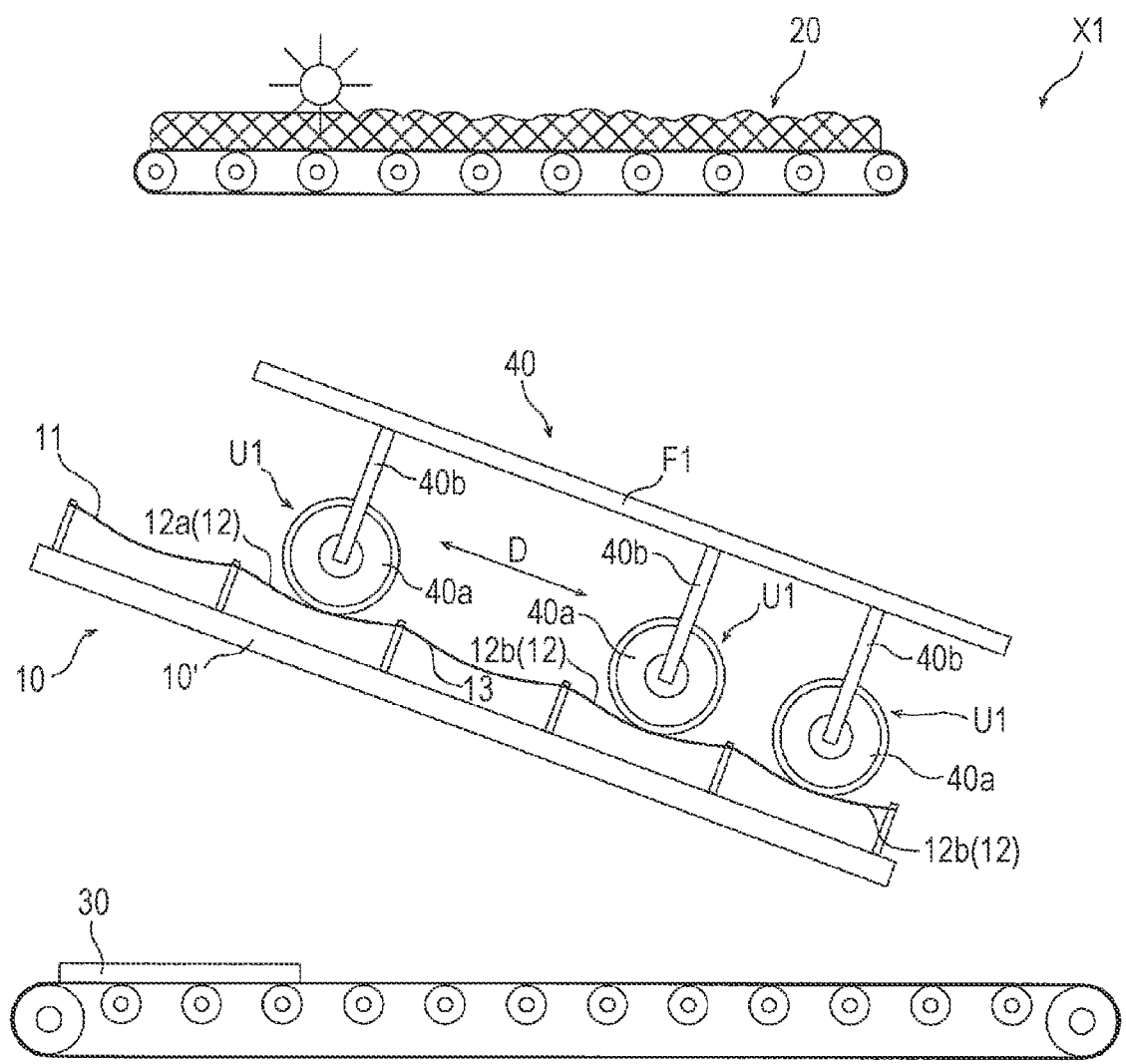
FIG. 7 shows the building material manufacturing apparatus shown in FIG. 1 in a cleaning mode.

As shown in FIG. 7, in each scraping unit U1 of the cleaning mechanism part 40, the contact disposition state in which each scraping part 40a is in contact with the corresponding screen sheet 12 of the screen part 10 is realized. For example, due to stretching or contraction of each connection structural part 40b, the corresponding scraping part 40a or the brush 42 thereof comes into contact with the corresponding screen sheet 12. Alternatively, in the scraping unit U1 shown in FIGS. 4 and 5, due to contraction of the cylinder mechanism of the displacement drive part 40d as shown in FIG. 4(b), the arm parts 43 change their orientation, and the scraping part 40a or the brush 42 is displaced downward via the orientation change and, thus, comes into contact with any one of the sheets 12. In addition, in each scraping unit U1, due to an operation of the motor part 47, the brush 42 of the scraping part 40a rotates. In this way, each scraping part 40a or each brush 42 rotates in contact with the corresponding screen sheet 12. Therefore, each screen sheet 12 is cleaned by the brush 42 of the corresponding scraping part 40a.

The above-described structure in which the building material manufacturing apparatus X1 includes the cleaning mechanism part 40 including the scraping parts 40a that are rotatable in contact with the respective screen sheets 12 when the apparatus operates in the cleaning mode is suitable for removing the building raw material M adhered to the screen sheets 12 from the screen sheets 12 and, thus, is suitable for suppressing clogging of the screen meshes of the screen sheets 12. The above-described structure in which the scraping parts 40a are separated from the respective screen sheets 12 when the apparatus operates in the building material manufacturing mode is suitable in properly operating the building material manufacturing apparatus X1 in the building material manufacturing mode by causing the screen sheets 12 to perform a proper wave motion.

As described above, the building material manufacturing apparatus X1 is suitable for suppressing clogging of the screen sheets 12 of the screen part 10 for screening the building raw material M. The suppression of the clogging of the screen sheets 12 is desirable in reducing time and effort required to maintain each screen sheet 12 or the screen part 10 and, thus, is desirable from the viewpoint of reducing building material manufacturing costs.

In the above-described conventional building material manufacturing apparatus including the screen part that performs screening by a winnowing method, the above-described blower for blowing air against a building raw material is relatively large and the apparatus for manufacturing a building material tends to increase in size and a facility for manufacturing a building material tends to become a large-scale facility. In addition, the execution of screening by a winnowing method at the screen part requires frequent cleaning of the apparatus and of the facility for manufacturing a building material.

In contrast, since the building material manufacturing apparatus X1 does not require such a blower, the building material manufacturing apparatus X1 is desirable in preventing the apparatus for manufacturing a building material from increasing in size and in preventing the facility for manufacturing a building material from becoming a large-scale facility, and, thus, is desirable from the viewpoint of reducing building material manufacturing costs. In addition, since the building material manufacturing apparatus X1 does not require screening by a winnowing method at the screen part 10, the building material manufacturing apparatus X1 is desirable in preventing a frequent cleaning operation of the apparatus for manufacturing a building material and of the facility for manufacturing a building material, and in reducing building material manufacturing costs.

As described above, the building material manufacturing apparatus X1 is suitable for efficiently manufacturing a building material from the viewpoint of, for example, manufacturing costs, while suppressing clogging of the screen sheets 12 of the screen part 10 for screening the building raw material M.

The brush 42 of each scraping part 40a of the building material manufacturing apparatus X1 is mounted spirally around the corresponding shaft part 41 as described above. Since each brush 42 easily enters the screen mesh of the corresponding screen sheet 12 when each brush 42 rotates in contact with the corresponding screen sheet 12, each brush 42 is desirable in removing the building raw material M adhered to the screen sheets 12 from the screen sheets 12, and, thus, is desirable in suppressing clogging of the screen mesh of each screen sheet 12.

Figure 8:
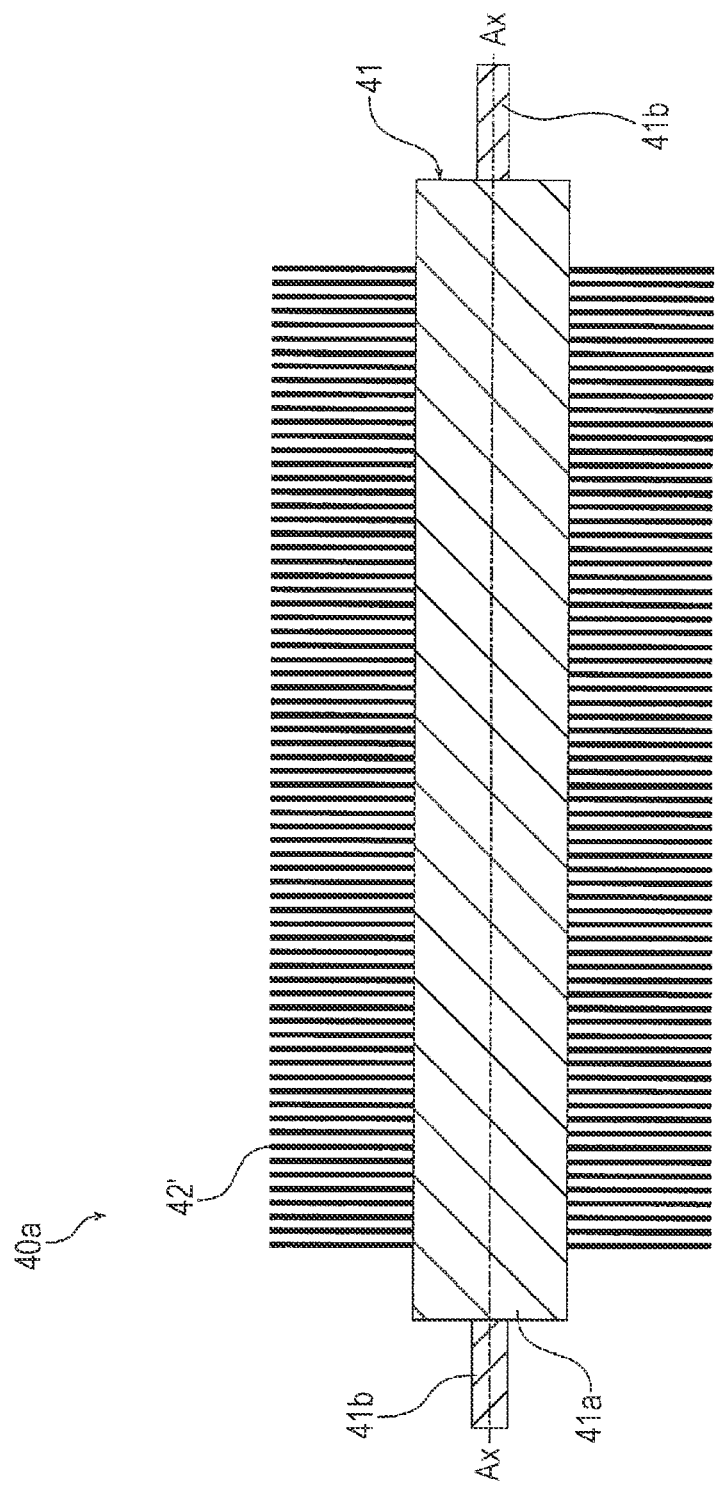
FIG. 8 shows a modification of a brush of the scraping part of the cleaning mechanism part.

In the building material manufacturing apparatus X1, instead of the above-described brush 42, each scraping part 40a may include, for example, a brush 42' shown in FIG. 8 (sectional view). In the brush 42', a plurality of pieces of brush hair stand with respect to the cylindrical main body 41a of the shaft part 41 so that, on a surface of the main body 41a, the pieces of brush hair are adjacent to each in a peripheral direction and in an extension direction of the surface. In the building material manufacturing apparatus X1, it is also possible to use the bush 42' having such a form and clean the screen sheets 12 in the cleaning mode.

Figure 9:
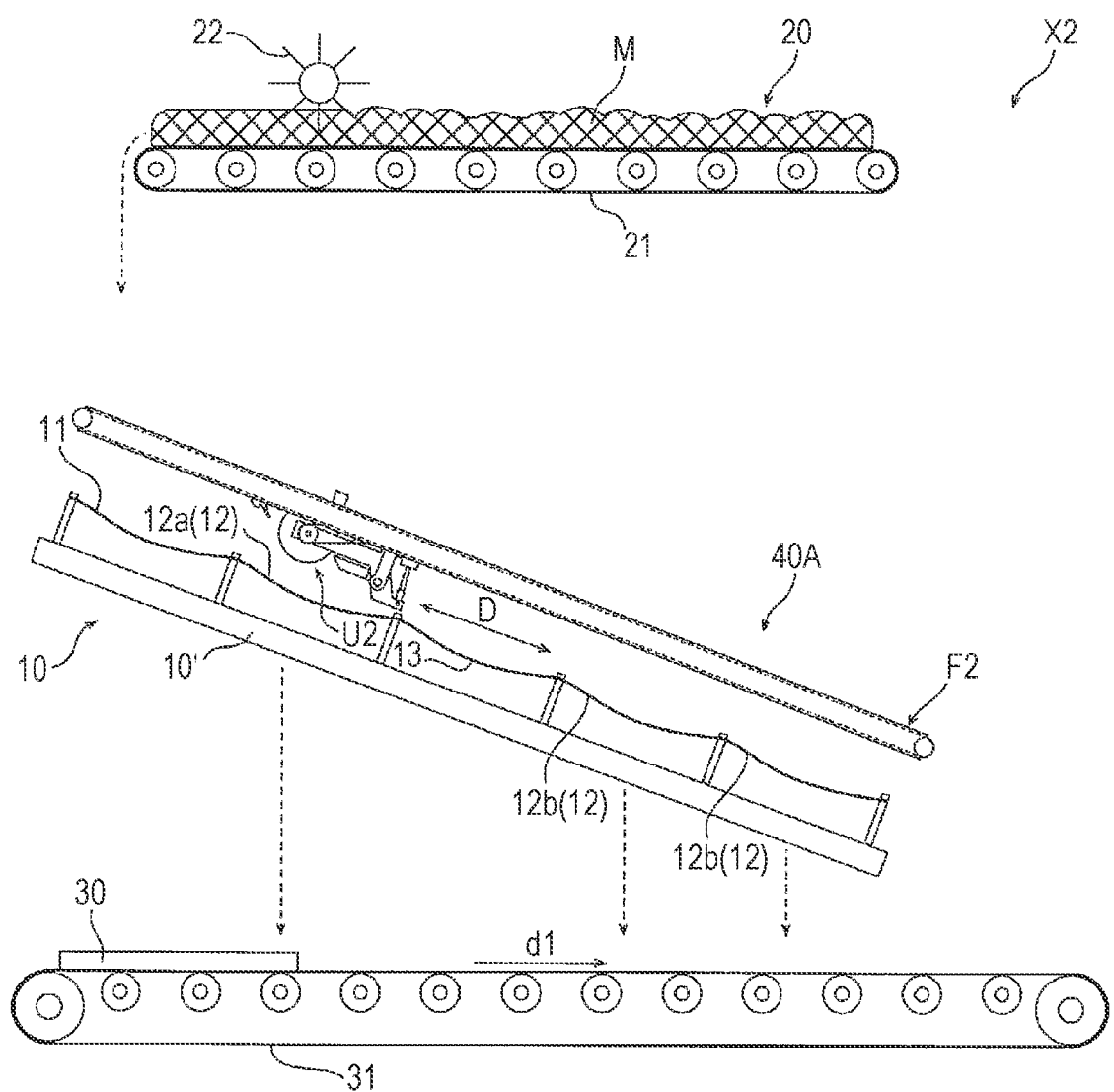
FIG. 9 is a schematic structural view of a building material manufacturing apparatus according to a second embodiment of the present invention, and shows the apparatus in a building material manufacturing mode.

FIG. 9 shows a schematic structure of a building material manufacturing apparatus X2 according to a second embodiment of the present invention. The building material manufacturing apparatus X2 includes a screen part 10, a raw material supply part 20, a receiving member 30, and a cleaning mechanism part 40A, and differs from the building material manufacturing apparatus X1 of the first embodiment in including the cleaning mechanism part 40A instead of the cleaning mechanism part 40.

The cleaning mechanism part 40A functions when the building material manufacturing apparatus X2 operates in a cleaning mode, and, as shown schematically in FIG. 9, includes a base structural part F2 that is disposed to oppose the screen part 10, and a scraping unit U2.

Figure 11:
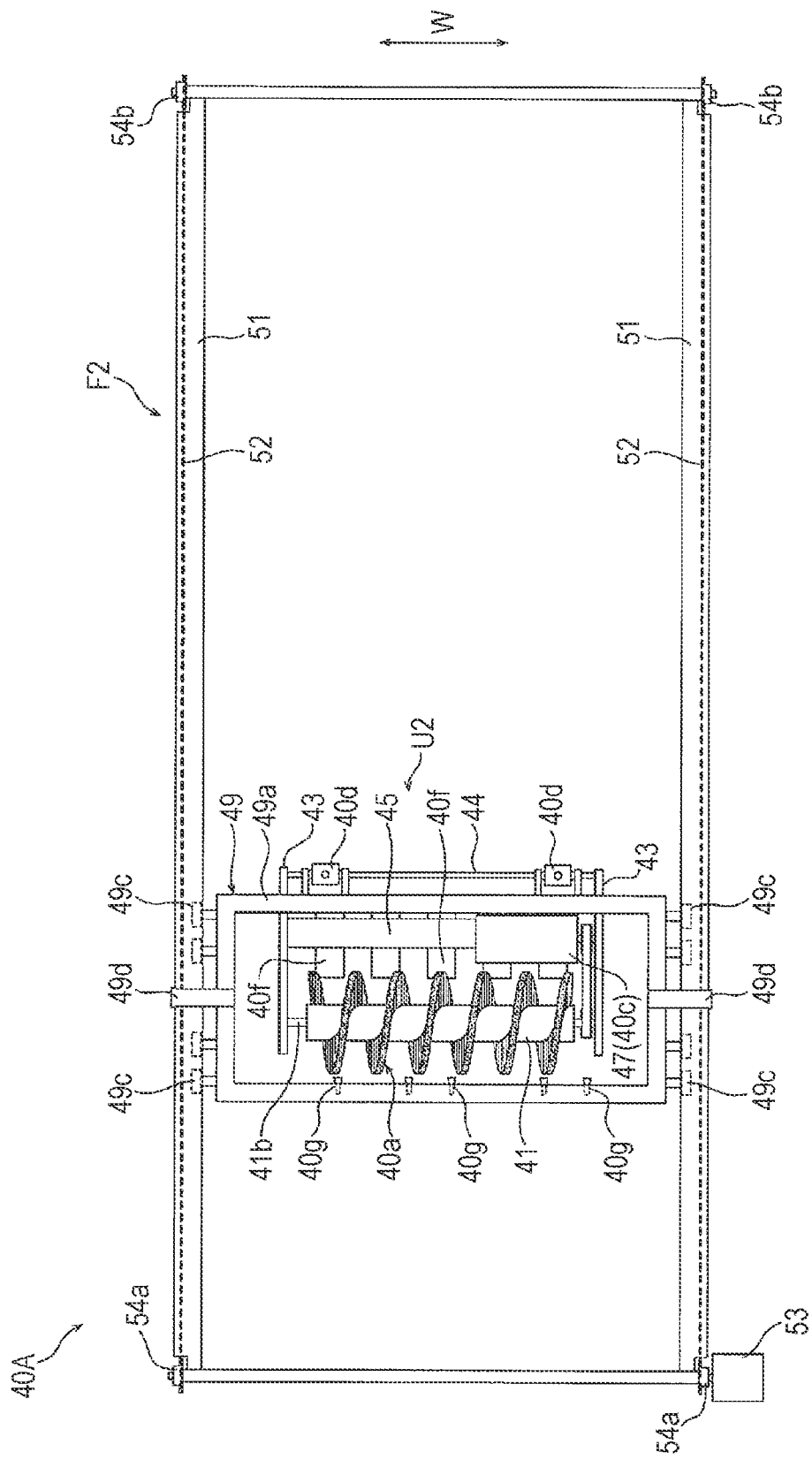
FIG. 11 is a plan view of a cleaning mechanism part of the building material manufacturing apparatus shown in FIG. 9.

The base structural part F2 is a part that supports other elements of the cleaning mechanism part 40A, and is fixed to, for example, a body structural part 10' of the screen part 10. As shown in FIG. 11, the base structural part F2 includes a pair of guide frames 51, chains 52 that are disposed at a corresponding one of the guide frames 51, a motor part 53 for driving the chains, and rollers 54a and 54b, and has a structure for causing the scraping unit U2 to be movable in an inclination direction D shown in FIG. 9.

Each guide frame 51 has an I shape in cross section in the present embodiment. Specifically, each guide frame 51 has a cross-sectional shape in which an inner recessed portion that opens on an inner side in a lateral direction and an outer recessed portion that opens on an outer side in the lateral direction extend over a region in an extension direction of the frames. Each chain 52 is disposed in the outer recessed portion of the corresponding guide frame 51. Specifically, each chain 52 is placed on the roller 54a that is disposed on one end portion of the corresponding guide frame 51 in the extension direction and on the roller 54b that is disposed on the other end portion of the corresponding guide frame 51 in the extension direction, and is disposed in the outer recessed portion of the corresponding guide frame 51. The motor part 53 rotationally drives the rollers 54a. When the building material manufacturing apparatus X2 operates in the cleaning mode, each chain 52 is pulled by being subjected to a drive power from the motor part 53 via the corresponding roller 54a.

As shown in FIGS. 10 and 11, the scraping unit U2 includes a scraping part 40a, a connection structural part 40e, a scraping drive part 40c, a displacement drive part 40d, a suction part 40f, and a blowing part 40g. The scraping unit U2 differs from the above-described scraping unit U1 in including the connection structural part 40e instead of the connection structural part 40b and further in including the suction part 40f and the blowing part 40g.

The connection structural part 40e is a part that mechanically connects the scraping part 40a to the base structural part F2, and, in the present embodiment, includes a pair of arm parts 43, a bar 44, a motor support part 45, and a unit frame part 49. The connection structural part 40e differs from the connection structural part 40b in including the unit frame part 49 instead of the bridge connection part 46. The other structures of the connection structural part 40e are the same as those of the connection structural part 40b.

The unit frame part 49 is a part that supports other elements of the scraping unit U2. The unit frame part 49 includes a frame main part 49a, two downwardly extending parts 49b, a plurality of rollers 49c, and a pair of link parts 49d.

In plan view as shown in FIG. 11, the frame main part 49a has a predetermined frame shape. As shown in FIG. 10, each downwardly extending part 49b extends downward from the frame main part 49a, and, at its lower end portion, rotatably supports the corresponding arm part 43. The plurality of rollers 49c are provided at a one end side and the other end side in a width direction W of the unit frame part 49. Each roller 49c is guided in the inner recessed portion of the corresponding guide frame 51.

One of the link parts 49d is provided on the one end side in the width direction W of the unit frame part 49, and the other link part 49d is provided on the other end side in the width direction W of the unit frame part 49. Each link part 49d is connected to the corresponding chain 52 that is disposed in the outer recessed portion of the opposing guide frame 51. Each link part 49d has a bent shape or a curved shape that extends to an outer side of the corresponding guide frame 51 so as to, from above the corresponding guide frame 51, extend to the corresponding guide frame 51 from the frame main part 49a of the unit frame part 49 (inner side of the guide frame 51). Due to each chain 52 moving in a predetermined direction, the unit frame part 49 including the link parts 49d that are fixed to the respective chains 52, or the scraping unit U2 moves.

The suction part 40f is a part for sucking a building raw material M that is scraped from screen sheets 12 by the scraping part 40a, and has a suction opening 40f'. The suction part 40f is connected to, for example, a dust collector (outside the figure) via a predetermined suction path (not shown) including a flexible hose. Due to an operation of the dust collector, the suction part 40f sucks in air via the suction opening 40f' thereof (suction operation). The suction part 40f is disposed on a lower side of the scraping part 40a in the inclination direction D of the screen sheets 12.

The blowing part 40g is, for example, an air nozzle for blowing air toward the scraping part 40a, and has a blowing opening 40g'. The blowing part 40g is connected to, for example, a compressor (outside the figure) via a predetermined blowing path (not shown) including a flexible hose. Due to an operation of the compressor, the blowing part 40g sends air via the blowing opening 40g' thereof (blowing operation). The blowing part 40g is positioned on an upper side of the scraping part 40a and the suction part 40f in the inclination direction D of the screen sheets 12.

Similarly to the scraping part 40a of the scraping unit U1 of the above-described first embodiment, the scraping part 40a of the scraping unit U2 is a part for removing the building raw material M adhered to the screen sheets 12 from the screen sheets 12, and includes a shaft part 41 and a brush 42 for being brought into contact with the screen sheets 12.

Similarly to the scraping drive part 40c of the scraping unit U1, the scraping drive part 40c of the scraping unit U2 includes a motor part 47 and a power transmission belt 48.

The displacement drive part 40d of the scraping unit U2 is an element for producing power for causing the connection structural part 40e to be displaced, and, in the present embodiment, includes a stretchable and contractable cylinder mechanism. The bar 44 is rotatably connected to a lower end portion in FIG. 10 of the displacement drive part 40d, and, as shown in FIG. 11, an upper end side in FIG. 10 of the displacement drive part 40d is rotatably connected to the frame main part 49a of the unit frame part 49.

In the scraping unit U2 having these structures, due to an operation of the motor part 47 of the scraping drive part 40c, the shaft part 41 and the brush 42 of the scraping part 40a rotate. Due to stretching of the cylinder mechanism of the displacement drive part 40d, the arm parts 43 change their orientation and the scraping part 40a or the brush 42 is displaced upward (displaced to, for example, the position shown in FIG. 10(a)) via the orientation change. Due to contraction of the cylinder mechanism of the displacement drive part 40d, the arm parts 43 change their orientation and the scraping part 40a or the brush 42 is displaced downward (displaced to, for example, the position shown in FIG. 10(b)) via the orientation change. In the base structural part F2, due to an operation of the motor part 53, the chains 52 are pulled and the scraping unit U2 is moved.

In the building material manufacturing apparatus X2 of the present embodiment, when the connection structural part 40e that connects the guide frames 51 of the base structural part F2 and the scraping part 40a is displaced (to the state shown in FIG. 10(b) from the state shown in FIG. 10(a)), the scraping part 40a comes into contact with any one of the screen sheets 12 when the apparatus operates in the cleaning mode. That is, due to the displacement of the connection structural part 40e, a separation disposition state shown in FIG. 9 in which the screen part 10 and the cleaning mechanism part 40A are separated from each other when the apparatus operates in the building material manufacturing mode and a contact disposition state shown in FIG. 12 in which the scraping part 40*a* of the cleaning mechanism part 40A is in contact with the screen part 10 when the apparatus operates in the cleaning mode are realized.

Figure 12:
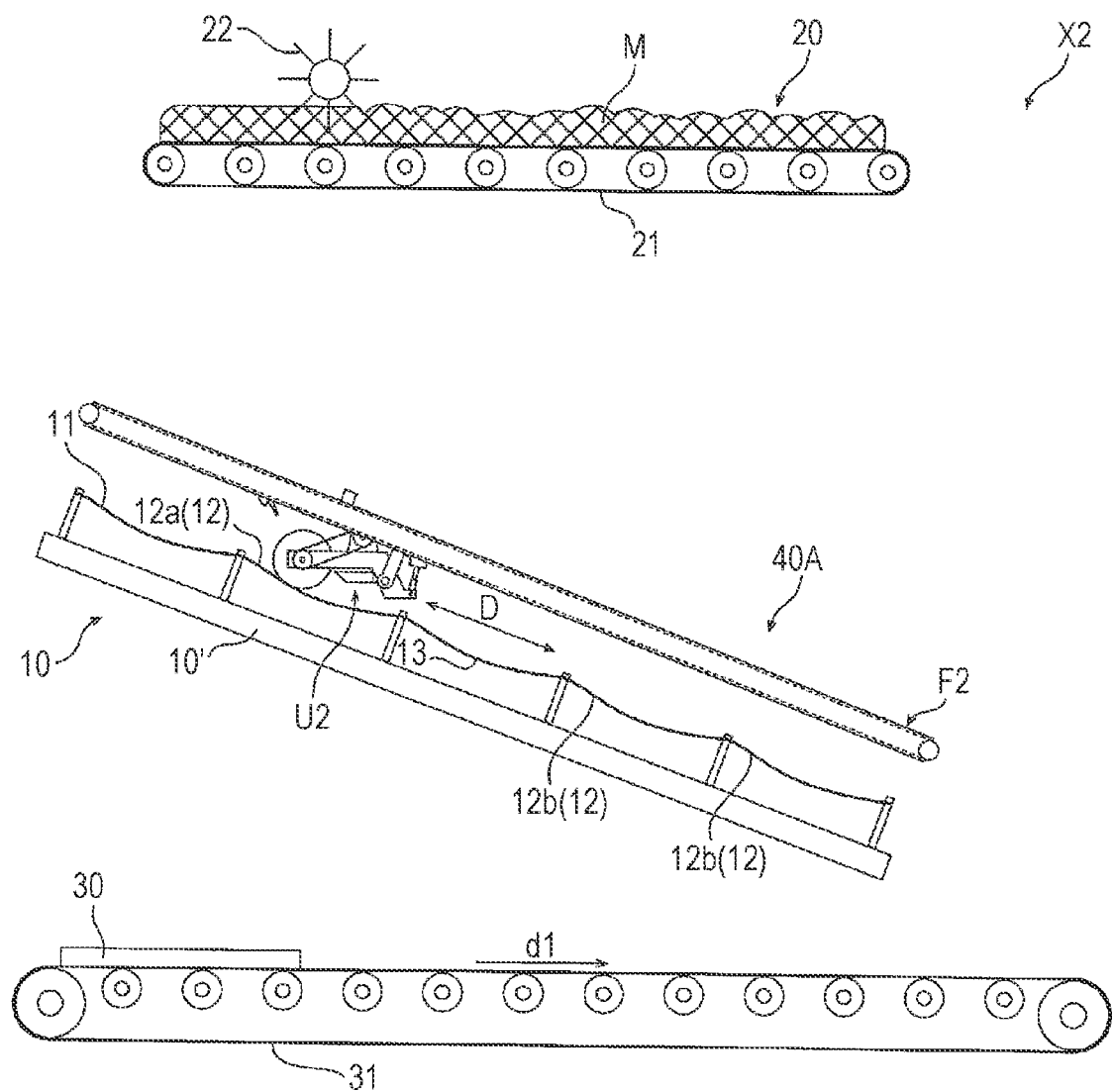
FIG. 12 shows the building material manufacturing apparatus shown in FIG. 9 in a cleaning mode.

In the building material manufacturing apparatus X2, it is possible to configure the connection structural part 40*e* to be stretchable and contractable so as to move the scraping part 40*a* upward and downward, and to, due to stretching and contraction of the connection structural part 40*e*, realize the separation disposition state shown in FIG. 9 in which the screen part 10 and the cleaning mechanism part 40A are separated from each other when the apparatus operates in the building material manufacturing mode and the contact disposition state shown in FIG. 12 in which the scraping part 40*a* of the cleaning mechanism part 40A is in contact with the screen part 10 when the apparatus operates in the cleaning mode.

In the building material manufacturing apparatus X2, it is possible to, due to relative movement in an up-down direction of the screen part 10 and the base structural part F2 of the cleaning mechanism part 40A opposing the screen part 10, bring the scraping part 40*a* into contact with the screen sheets 12 when the apparatus operates in the cleaning mode. That is, it is possible to, due to the relative movement in the up-down direction of the screen part 10 and the base structural part F2 of the cleaning mechanism part 40A opposing the screen part 10, realize the separation disposition state in which the screen part 10 and the cleaning mechanism part 40A are separated from each other when the apparatus operates in the building material manufacturing mode and the contact disposition state in which the scraping part 40*a* of the cleaning mechanism part 40A is in contact with the screen part 10 when the apparatus operates in the cleaning mode. In the above-described relative movement, the base structural part F2 of the cleaning mechanism part 40A may move upward and downward with respect to the screen part 10, or the screen part 10 may move upward and downward with respect to the base structural part F2 of the cleaning mechanism part 40A.

The building material manufacturing apparatus X2 having above-described the structure includes the screen part 10, the raw material supply part 20, and the receiving member 30, which are the same as those of the building material manufacturing apparatus X1, and, in the building material manufacturing mode, is capable of forming a raw material mat for a building material on the receiving member 30 by operating the apparatus in the same as way as described above with regard to the building material manufacturing apparatus X1. Therefore, as described above with regard to the building material manufacturing apparatus X1, the building material manufacturing apparatus X2 is suitable for manufacturing a building material while suppressing clogging of the screen sheets 12 of the screen part 10 for screening the building raw material M.

On the other hand, the building material manufacturing apparatus X2 operates as follows in the cleaning mode (in the cleaning mode, an eccentric vibrator of the body structural part 10' of the screen part 10 is stopped to stop the wave motion of each sheet, and the supply of the building raw material M to the screen part 10 from the raw material supply part 20 is stopped).

As shown in FIG. 12, in the scraping unit U2 of the cleaning mechanism part 40A, the contact disposition state in which the scraping part 40*a* is in contact with a screen sheet 12 of the screen part 10 is realized. In the scraping unit U2 shown in FIGS. 10 and 11, due to contraction of the cylinder mechanism of the displacement drive part 40*d* as shown in FIG. 10(*b*), the arm parts 43 change their orientation and the scraping part 40*a* or the brush 42 is displaced downward via the orientation change, as a result of which the scraping part 40*a* or the brush 42 thereof comes into contact with the screen sheet 12.

In addition, in the scraping unit U2, due to an operation of the motor part 47, the brush 42 of the scraping part 40*a* rotates. Therefore, the scraping part 40*a* or the brush 42 rotates in contact with the screen sheet 12.

In the scraping unit U2, the blowing part 40*g* performs a blowing operation to send air (for example, to blow air) from the blowing opening 40*g*' thereof, and the suction part 40*f* performs a suction operation to suck in air from the suction opening 40*f*'.

In the cleaning mode of the building material manufacturing apparatus X2, in the state above, the scraping unit U2 is moved in the inclination direction D along the guide frames 51 at the screen sheet 12. Specifically, the chains 52 in the outer recessed portions of the respective guide frames 51 are subjected to drive power from the above-described motor part 53 of the cleaning mechanism part 40A and are pulled in a predetermined direction, as a result of which the scraping unit U2 is moved in the inclination direction D. In the present embodiment, the scraping unit U2 is moved from a position (a first position) opposing a screen sheet 12*a* of the sheets of the screen part 10 (the screen sheet 12*a* being positioned at an uppermost position of the screen sheets 12) to a position (a second position) opposing a screen sheet 12*b* that is positioned at a lowermost position, and then is moved to the first position from the second position. Therefore, all of the screen sheets 12 included in the screen part 10 are cleaned by the brush 42 of the scraping part 40*a* of the scraping unit U2.

The above-described structure in which the building material manufacturing apparatus X2 includes the cleaning mechanism part 40A including the scraping part 40*a* that is rotatable in contact with any one of the screen sheets 12 when the apparatus operates in the cleaning mode is suitable for removing the building raw material M adhered to the screen sheet 12 from the screen sheet 12 and, thus, is suitable for suppressing clogging of the screen mesh of the screen sheet 12. The above-described structure in which the scraping part 40*a* is separated from the screen sheets 12 when the apparatus operates in the building material manufacturing mode is desirable in properly operating the building material manufacturing apparatus X2 in the building material manufacturing mode by causing the screen sheets 12 to perform a proper wave motion.

The brush 42 of the scraping part 40*a* of the building material manufacturing apparatus X2 is mounted spirally around the shaft part 41 as described above. Since such a brush 42 easily enters the screen mesh of any one of the screen sheets 12 when the brush 42 rotates in contact with the screen sheet 12, the brush 42 is desirable in removing the building raw material M adhered to the screen sheet 12 from the screen sheet 12, and, thus, is desirable in suppressing clogging of the screen mesh of the screen sheet 12. Instead of the above-described brush 42, the scraping part 40*a* may include, for example, the brush 42' shown in FIG. 8.

In the building material manufacturing apparatus X2, when the apparatus operates in the cleaning mode, the scraping part 40*a* is movable in the inclination direction D of the screen sheets 12 while rotating in contact with any one of the screen sheets 12. Such a structure is suitable for rotating the scraping part 40*a* in contact with the screen sheet 12 while applying a proper pressure to the screen sheet 12 by the scraping part 40*a* and, thus, is desirable in suppressing clogging of the screen mesh of the screen sheet 12. In addition, this structure is suitable for reducing the number of scraping parts 40a to be provided for cleaning the entire one or two or more screen sheets 12.

In addition, as described above, the cleaning mechanism part 40A of the building material manufacturing apparatus X2 includes the suction part 40f for sucking the building raw material M that is scraped from the screen sheets 12 by the scraping part 40a. The suction part 40f is disposed on the lower side of the scraping part 40a in the inclination direction D of the screen sheets 12. Such structures are suitable for discharging the building raw material M that has been removed from the screen sheets 12 by the scraping part 40a to the outside of the screen part 10 or the outside of the building material manufacturing apparatus X2. Such structures are also suitable for suppressing the building raw material M that has been removed from the screen sheets 12 by the scraping part 40a from flying.

Further, as described above, the cleaning mechanism part 40A of the building material manufacturing apparatus X2 includes the building part 40g for blowing air toward the scraping part 40a on the upper side of the scraping part 40a in the inclination direction D of the screen sheets 12. Such a structure is suitable for suppressing a reduction in scraping efficiency occurring when the building raw material M that has been removed from the screen sheets 12 by the scraping part 40a adheres to the scraping part 40a. In addition, such a structure is suitable for sending the building raw material M that has been removed from the screen sheets 12 by the scraping part 40a to the coarse-mesh screen sheets 12b that are disposed on a lower side of the sheets of the screen part 10 by blowing air from the blowing part 40g, and causing the building raw material M to drop from the screen meshes of the coarse-mesh screen sheets 12b, is suitable for causing the building raw material M to be sucked by the suction part 40f that is positioned on the lower side of the scraping part 40a, and, thus, is suitable for suppressing the building raw material M that has been removed from the screen sheets 12 by the scraping part 40a from remaining on the screen sheets 12.

As described above, the building material manufacturing apparatus X2 is suitable for suppressing clogging of the screen sheets 12 of the screen part 10 for screening the building raw material M. The suppression of the clogging of the screen sheets 12 is desirable in reducing time and effort required to maintain each screen sheet 12 or the screen part 10 and, thus, is desirable from the viewpoint of reducing building material manufacturing costs.

The scraping unit U1 of the building material manufacturing apparatus X1 described above as the first embodiment may include the above-described suction part 40f and blowing part 40g of the scraping unit U2 of the building material manufacturing apparatus X2. In this case, in the scraping unit U1, the suction part 40f is positioned on the lower side of the scraping part 40a in the inclination direction D of the screen sheets 12, and the blowing part 40g is positioned on the upper side of the scraping part 40a and the suction part 40f in the inclination direction D of the screen sheets 12. The technical effects of the scraping unit U1 including the suction part 40f and the blowing part 40g are the same as the technical effects of the scraping unit U2 including the suction part 40f and the blowing part 40g.

REFERENCE SIGNS LIST

X1, X2 building material manufacturing apparatus
D inclination direction
W width direction
10 screen part
11 receive-send sheet
12, 12a, 12b screen sheet
13 relay sheet
20 raw material supply part
21 belt conveyor
22 leveling part
30 receiving member
31 transport line
40, 40A cleaning mechanism part
F1, F2 base structural part
U1, U2 scraping unit
40a scraping part
40b, 40e connection part structural part
40c scraping drive part
40d displacement drive part
40f suction part
40g blowing part
41 shaft part
42, 42' brush
43 arm part
44 bar
47, 53 motor part
51 guide frame
52 chain

The invention claimed is:

1. A building material manufacturing apparatus comprising:
a screen part that includes at least one screen sheet that has an inclination and that has a screen mesh; and
a cleaning mechanism part that includes a scraping part,
wherein, when the apparatus operates in a building material manufacturing mode in which a building raw material is supplied to the screen sheet and the screen sheet is performing a wave motion, the scraping part is separated from the screen sheet, and
wherein, when the apparatus operates in a cleaning mode in which the building raw material is not supplied to the screen sheet and the screen sheet is not performing a wave motion, the scraping part rotates in contact with the screen sheet,
wherein the cleaning mechanism part includes a suction part for sucking the building raw material, and a blowing part for blowing air,
wherein the suction part and the blowing part are positioned at opposite sides of the scraping part,
wherein the blowing part is for blowing air toward the scraping part, the blowing part being provided on an upper side of the scraping part in a direction of the inclination of the screen sheet.

2. The building material manufacturing apparatus according to claim 1, wherein, when the apparatus operates in the cleaning mode, the scraping part is movable in a direction of the inclination of the screen sheet while rotating in contact with the screen sheet.

3. The building material manufacturing apparatus according to claim 1, wherein the scraping part includes a rotatable shaft part and a brush for being brought into contact with the screen sheet, the brush being mounted on the shaft part.

4. The building material manufacturing apparatus according to claim 3, wherein the brush is mounted spirally around the shaft part.

5. The building material manufacturing apparatus according to claim 1, wherein the cleaning mechanism part includes a base structural part that is disposed to oppose the screen part, and a connection structural part that connects the base structural part and the scraping part, and that, when the apparatus operates in the cleaning mode, is capable of causing the scraping part to be displaced to contact the screen sheet.

6. The building material manufacturing apparatus according to claim 1, wherein, due to relative movement of the screen part and the cleaning mechanism part, the scraping part contacts the screen sheet when the apparatus operates in the cleaning mode.

7. The building material manufacturing apparatus according to claim 1, wherein the suction part is for sucking the building raw material that is scraped from the screen sheet by the scraping part.

8. A building material manufacturing apparatus comprising:
- a screen part that includes at least one screen sheet that has an inclination and that has a screen mesh; and
- a cleaning mechanism part that includes a scraping part,
- wherein, when the apparatus operates in a building material manufacturing mode in which a building raw material is supplied to the screen sheet and the screen sheet is performing a wave motion, the scraping part is separated from the screen sheet, and
- wherein, when the apparatus operates in a cleaning mode in which the building raw material is not supplied to the screen sheet and the screen sheet is not performing a wave motion, the scraping part rotates in contact with the screen sheet,
- wherein the cleaning mechanism part includes a suction part for sucking the building raw material, and a blowing part for blowing air,
- wherein the suction part and the blowing part are positioned at opposite sides of the scraping part,
- wherein the suction part is positioned on a lower side of the scraping part in a direction of the inclination of the screen sheet.

9. The building material manufacturing apparatus according to claim 8, wherein, when the apparatus operates in the cleaning mode, the scraping part is movable in a direction of the inclination of the screen sheet while rotating in contact with the screen sheet.

10. The building material manufacturing apparatus according to claim 8, wherein the scraping part includes a rotatable shaft part and a brush for being brought into contact with the screen sheet, the brush being mounted on the shaft part.

11. The building material manufacturing apparatus according to claim 10, wherein the brush is mounted spirally around the shaft part.

12. The building material manufacturing apparatus according to claim 8, wherein the cleaning mechanism part includes a base structural part that is disposed to oppose the screen part, and a connection structural part that connects the base structural part and the scraping part, and that, when the apparatus operates in the cleaning mode, is capable of causing the scraping part to be displaced to contact the screen sheet.

13. The building material manufacturing apparatus according to claim 8, wherein, due to relative movement of the screen part and the cleaning mechanism part, the scraping part contacts the screen sheet when the apparatus operates in the cleaning mode.

14. The building material manufacturing apparatus according to claim 8, wherein the suction part is for sucking the building raw material that is scraped from the screen sheet by the scraping part.

* * * * *